(12) United States Patent
Kazami

(10) Patent No.: US 10,999,522 B2
(45) Date of Patent: May 4, 2021

(54) CONTROL APPARATUS, CONTROL METHOD, AND COMPUTER-READABLE STORAGE MEDIUM

(71) Applicant: CANON KABUSHIKI KAISHA, Tokyo (JP)

(72) Inventor: Yusuke Kazami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/400,114

(22) Filed: May 1, 2019

(65) Prior Publication Data

US 2019/0349508 A1 Nov. 14, 2019

(30) Foreign Application Priority Data

May 14, 2018 (JP) .............................. JP2018-093373
Feb. 21, 2019 (JP) .............................. JP2019-029220

(51) Int. Cl.
*H04N 5/235* (2006.01)
*G06T 7/50* (2017.01)
*G06T 7/80* (2017.01)
*G06T 7/60* (2017.01)

(52) U.S. Cl.
CPC .............. *H04N 5/2353* (2013.01); *G06T 7/50* (2017.01); *G06T 7/60* (2013.01); *G06T 7/80* (2017.01)

(58) Field of Classification Search
None
See application file for complete search history.

(56) References Cited

U.S. PATENT DOCUMENTS

| 2009/0040341 | A1* | 2/2009 | Ueyama | ............. H04N 5/23212 348/240.99 |
| 2010/0214444 | A1* | 8/2010 | Teshima | ............. H04N 5/23212 348/231.3 |
| 2013/0120618 | A1* | 5/2013 | Wang | ................. H04N 5/23296 348/240.99 |

FOREIGN PATENT DOCUMENTS

| JP | 2014-022863 A | 2/2014 |
| JP | 2015-154409 A | 8/2015 |
| JP | 2016-122030 A | 7/2016 |

* cited by examiner

*Primary Examiner* — Quan Pham
(74) *Attorney, Agent, or Firm* — Cowan, Liebowitz & Latman, P.C.

(57) ABSTRACT

A control apparatus includes a processor is configured to function as an information acquisition unit configured to acquire object size information from image data by a first method and a second method in continuous imaging, and an imaging control unit configured to perform an exposure while performing follow-up drive of an optical system so as to reduce a difference between the object size information and target size information.

21 Claims, 14 Drawing Sheets

CONTROL APPARATUS, CONTROL METHOD, AND COMPUTER-READABLE STORAGE MEDIUM

BACKGROUND OF THE INVENTION

Field of the Invention

The present invention relates to an imaging apparatus (or image capturing apparatus) that can provide zooming panning (follow shot) of a moving object.

Description of the Related Art

One conventional imaging method for a camera is called "panning (follow shot)." The "panning" is a method of setting a low shutter speed in order to obtain a dynamic feeling of an object and of capturing images while the camera follows a horizontal movement of the object. For the object moving to or away from the camera, a "zooming panning" method is used that captures an image while changing a focal length with a zoom function in order to maintain constant the object size in the whole image. Such imaging as the "panning" and the "zooming panning" often sets a shutter speed lower than that set for the normal imaging, and requires an imaging technique because the object size needs to be maintained during exposure. For example, Japanese Patent Laid-Open No. ("JP") 2015-154409 discloses a method that provides "zooming panning" through follow-up drive of an imaging optical system to an object based on the object movement before the exposure so that the object falls within a predetermined range in a whole image during the exposure.

However, the method disclosed in JP 2015-154409 does not particularly consider the exposure start timing and starts the exposure when receiving the user instruction. Thus, for example, when the object movement (moving speed) suddenly changes just before the exposure, etc., the exposure may start while the follow-up drive of the imaging optical system delays.

SUMMARY OF THE INVENTION

The present invention provides a control apparatus, a control method, and a computer-readable storage medium, each of which can provide good zooming panning of a moving object.

A control apparatus according to one aspect of the present invention includes at least one processor which function as an acquisition unit configured to acquire an object size from image data, a zoom control unit configured to perform a follow-up control of a zoom so as to reduce a difference between the object size and a target size, and an imaging control unit configured to control an image sensor so as to perform exposure during the follow-up control by the zoom control unit. The imaging control unit controls the image sensor so as not to start the exposure of the image sensor when a change amount of the object size is larger than a predetermined value.

A control method according to another aspect of the present invention includes the steps of acquiring an object size from image data, performing a follow-up control of a zoom so as to reduce a difference between the object size and a target size, and controlling an image sensor so as to perform exposure during the follow-up control by the zoom control unit. The controlling step controls the image sensor so as not to start the exposure of the image sensor when a change amount of the object size is larger than a predetermined value.

A control apparatus according to another aspect of the present invention includes at least one processor which function as an acquisition unit configured to acquire an object size from image data, a zoom control unit configured to perform a follow-up control of an optical system so as to reduce a difference between the object size and a target size, and an imaging control unit configured to control an image sensor so as to perform exposure during the follow-up control by the zoom control unit. The imaging control unit predicts a follow-up time from when the follow-up control is started to when the follow-up control is stabilized, before the follow-up control starts, and starts driving the optical system according to the follow-up time.

A control method according to another aspect of the present invention includes the steps of acquiring an object size from image data, performing a follow-up control of an optical system so as to reduce a difference between the object size and a target size, and controlling an image sensor so as to perform exposure during the follow-up control by the zoom control unit. The step of performing the follow-up control predicts a follow-up time from when the follow-up control is started to when the follow-up control is stabilized, before the follow-up control starts, and starts driving the optical system according to the follow-up time.

A non-transitory computer readable storage medium storing a program that enables a computer to execute the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments of the present invention.

Figure 1:
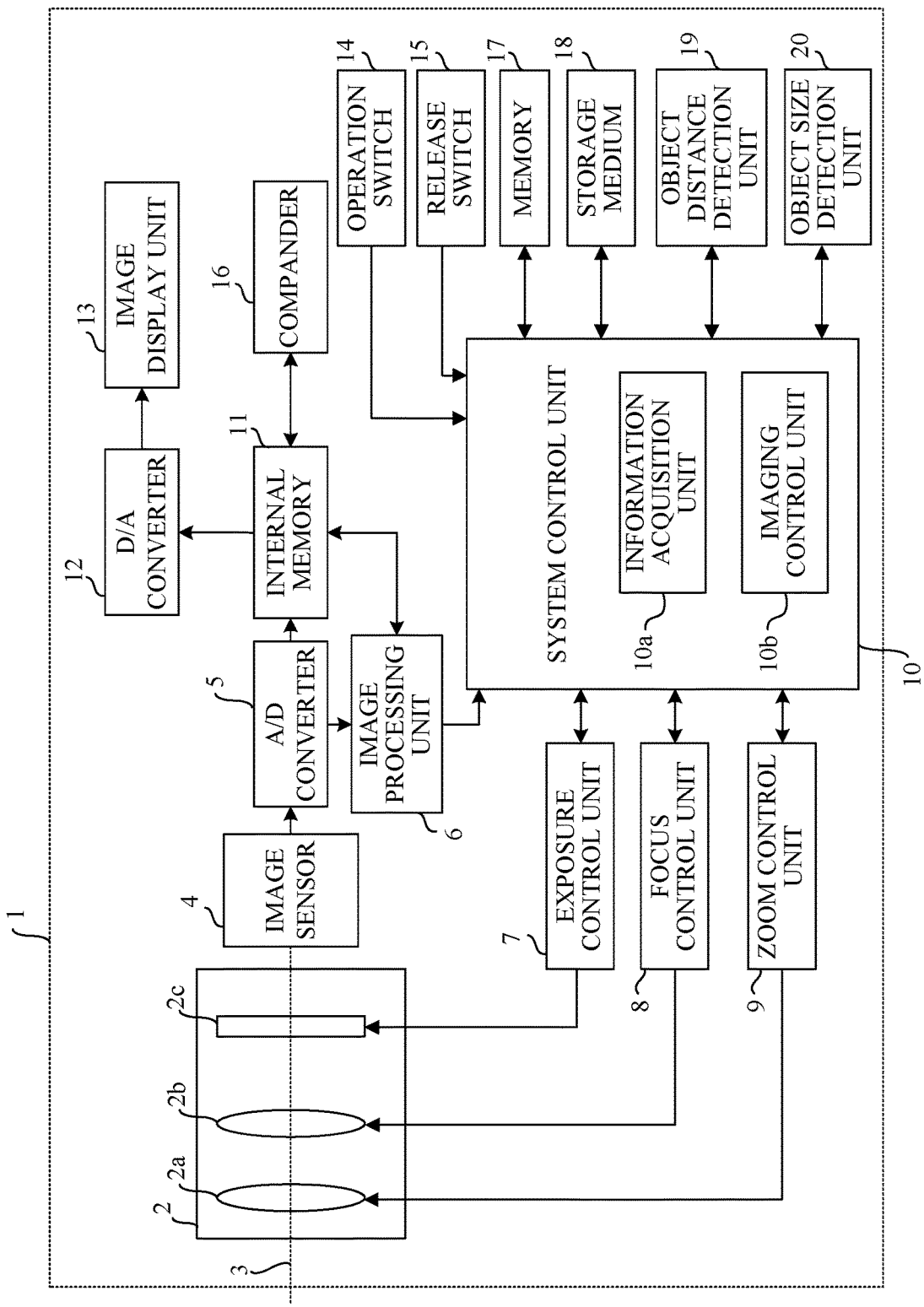
FIG. 1 is a block diagram of an imaging apparatus according to each embodiment.

Referring now to FIG. 1, a description will be given of a system configuration of an imaging apparatus according to this embodiment. FIG. 1 is a block diagram of the imaging apparatus 1. In this embodiment, the imaging apparatus 1 is, but not limited to, a digital camera, and is applicable to other imaging apparatuses such as a mobile phone with a camera.

In the imaging apparatus 1, the optical system (imaging optical system) 2 includes a zoom lens 2a, a focus lens 2b, a diaphragm shutter unit 2c, and the like. The zoom lens 2a and the focus lens 2b are movable along an optical axis 3 in the optical system 2. An image sensor 4 includes a CMOS sensor or a CCD sensor, photoelectrically converts an optical image (object image) formed via the optical system 2, and outputs an electric signal (image data). The image sensor 4 includes a plurality of photoelectric conversion elements sharing one micro lens, and the plurality of photoelectric conversion elements are configured to receive light passing through different pupil regions in the optical system 2. This configuration enables AF (autofocus) processing of an imaging surface phase difference method. An A/D converter 5 converts the electric signal (analog signal) output from the image sensor 4 into a digital signal.

An image processing unit 6 performs predetermined pixel interpolation processing, color conversion processing, and gamma processing for the data output from the A/D converter 5. The image processing unit 6 performs predetermined processing using the captured image data. A system control unit (control apparatus) 10 controls an exposure control unit 7 and a focus control unit 8 based on a result processed by the image processing unit 6. In other words, the system control unit 10 performs the AF processing of the imaging surface phase difference method and AE (auto-exposure) processing, etc. The image processing unit 6 performs predetermined arithmetic processing using the captured image data, and can perform AWB (auto white balance) processing based on the calculation result obtained by the above calculation processing.

The image data output from the A/D converter 5 via the image processing unit 6 or the image data output from the A/D converter 5 directly is written in an internal memory 11. The image data written in the internal memory 11 is displayed on an image display unit 13 via a D/A converter 12. The image display unit 13 is a TFT, an LCD, or the like. The image display unit 13 can realize the electronic viewfinder function by sequentially displaying the image data captured using the image display unit 13. In addition to displaying the image, the image display unit 13 displays a variety of menu items related to a variety of settings of the imaging apparatus 1 and imaging conditions such as a zoom magnification, an exposure setting, and the like with or without image display. The user can change the setting of the designated item by properly selecting the menu item and the imaging condition displayed on the image display unit 13 while operating an operation switch 14.

A compander (compression and decompression unit) 16 compresses and decompresses the image data by adaptive discrete cosine transformation (ADCT) or the like. In other words, the compander 16 reads the image data stored in the internal memory 11, performs compression processing or decompression processing, and writes the processed image data in the internal memory 11 again. The internal memory 11 is a storage unit for storing captured still image and motion image data, and has a sufficient storage amount for storing a predetermined number of still image data and motion image data for a predetermined time. Thereby, a large amount of image data can be written at a high speed in the internal memory 11 even in continuous imaging that consecutively captures a plurality of still image data. The internal memory 11 can also be used as a work area for the system control unit 10.

The exposure control unit 7 controls a diaphragm shutter unit 2c. The focus control unit 8 controls the focus lens 2b. The zoom control unit 9 controls the zooming operation by the zoom lens 2a and calculates the focal length information according to the current position of the zoom lens 2a. The current focal length information (focal length information acquired at a second timing) is stored in the internal memory 11 via the system control unit 10.

The system control unit 10 controls the entire imaging apparatus 1. The system control unit 10 also includes an information acquisition unit 10a and an imaging control unit 10b. The information acquiring unit 10a acquires the object size information from the image data. The imaging control unit 10b performs exposure while performing the follow-up drive of the optical system 2 so as to reduce a difference between the object size information and the target size information. In this embodiment, the imaging control unit 10b controls the exposure start timing based on the follow-up degree of the follow-up drive. In the present invention and the specification, the exposure means that the pixels in the image sensor accumulate charges for recording and imaging. The recording and imaging refer to imaging recorded on a storage unit in an imaging apparatus, a recording medium attached to the imaging apparatus, a device connected to a network with an imaging apparatus, a cloud, or the like. In general, it is imaging started with a release instruction. In this embodiment, the follow-up degree is information on the difference between the object size information and the target size information, but it is not limited to this embodiment. Assume that when the difference between the object size and the target size is small, the follow-up degree is high, and when the difference is large, the follow-up degree is low. If the difference between the object size and the target size is small, the follow-up degree is high, and if the difference degree is large, the follow-up degree is low, it may be acquired using the size information or from the distance information to the object. When the change amount in the object distance can be canceled by the zoom drive, the difference between the object size and the target size is small, so that the follow-up degree increases.

A memory (storage unit) 17 stores constants, variables, programs, and the like for operations of the system control unit 10. The memory 17 stores information (such as target size information and numerical information as a threshold for switching a variety of controls) necessary for the zooming panning.

The operation switch 14 and a release switch 15 are operation units used to input a variety of operation instructions of the system control unit 10, and include a single switch or a combination of switches, dials, a touch panel, a voice recognition device, etc. This embodiment provides the operation switch 14 with a switch, a zoom operation lever, a menu button, a set button, and the like for switching functional modes such as a power supply, an imaging mode, a reproduction mode and the like. In switching of the imaging mode, one of the plurality of imaging modes, such as still image capturing, motion image capturing, zooming panning or the like can be arbitrarily selected.

The release switch 15 is a member for inputting an imaging instruction from the user. More specifically, the release switch 15 can be pressed in two stages. For example, in the still image capturing, the user instructs an imaging preparation with a half-pressed operation (SW1) which is a pressing operation up to the first stage, and performs imaging with a fully pressed (SW2) operation as the pressing operation up to the second stage. In response to the half-pressed operation (SW1) as the imaging preparation instruction, the system control unit 10 controls the focus control unit 8 and the exposure control unit 7 for the imaging preparation operation such as the AF processing and the AE processing. In response to the fully pressed operation (SW2) as an imaging instruction, the system control unit 10 drives the diaphragm shutter unit 2c via the exposure control unit 7 for a control of taking the object image into the image sensor 4. More specifically, the system control unit 10 places the image sensor 4 in an accumulation state and opens and closes the shutter mechanism included in the diaphragm shutter unit 2c, thereby exposing the object image.

After the shutter mechanism returns to the closed state and the charge accumulation of the image sensor 4 is completed, the system control unit 10 reads the accumulated electric charges as a signal. The system control unit 10 performs a series of development processing and image processing for the signal read out of the image sensor 4 using the A/D converter 5, the image processing unit 6, the compander 16, and the internal memory 11, and generates image data. The generated image data is recorded as an image file in a storage medium 18. The processing from the imaging preparation instruction to the recording of the image file is referred to as imaging processing. The storage medium 18 can use a storage medium having a capacity sufficient for recording a plurality of image data, such as a hard disk drive and a flash memory.

The object distance detection unit 19 detects object distance information corresponding to the distance from the imaging apparatus 1 to the object. A description will now be given of a method of detecting object distance information by the object distance detection unit 19. There are a plurality of detection methods as methods for detecting object distance information, and one conceivable example is a detection method using the AF processing. For example, the AF processing by the imaging surface phase difference method is performed using the image sensor 4 having the function of the phase difference sensor. Thereby, the position of the focus lens 2b configured to focus on the object in the image can be specified based on the phase difference between the two signals obtained by dividing the light incident on the optical system 2 in two directions. The system control unit 10 can calculate the current (at the second timing) position (focal length information) of the zoom lens 2a and the object distance focused on the position of the focus lens 2b, and detect the object distance information.

The object size detection unit 20 detects information (object size information) on the size of the object in the image data. A description will now be given of a method of detecting the object size information by the object size detection unit 20. There are a plurality of detection methods as methods for detecting the object size information, and one of them is a detection method using a motion vector (motion vector information).

Figure 2A:
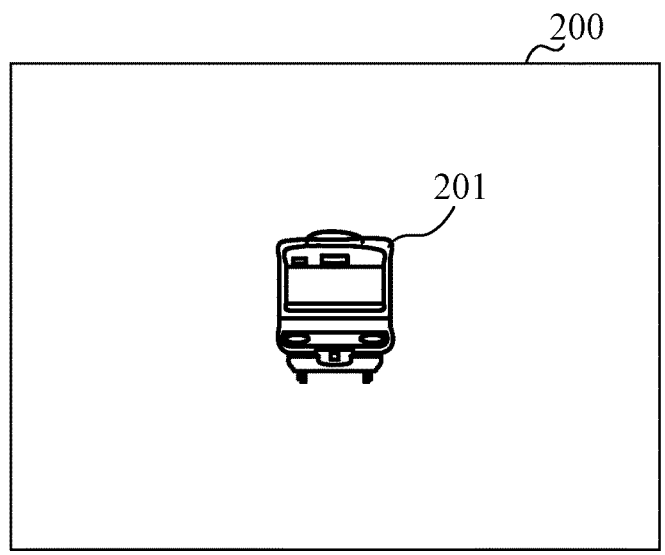
FIGS. 2A to 2C are explanatory diagrams of a method for detecting an object size according to each embodiment.
Figure 2B:
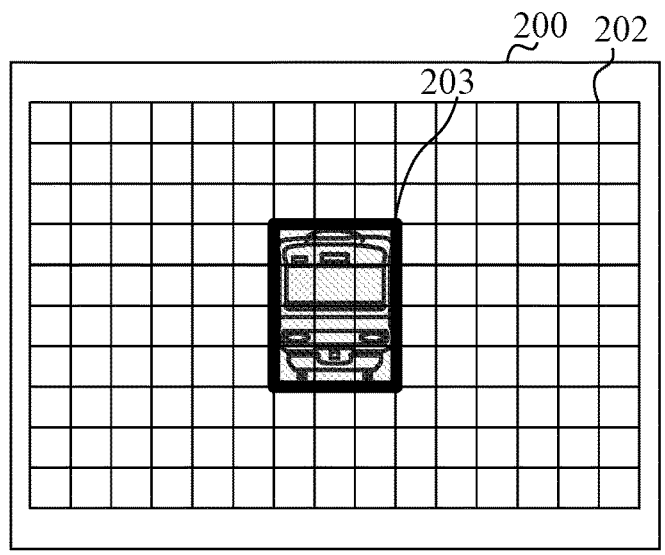
Figure 2C:
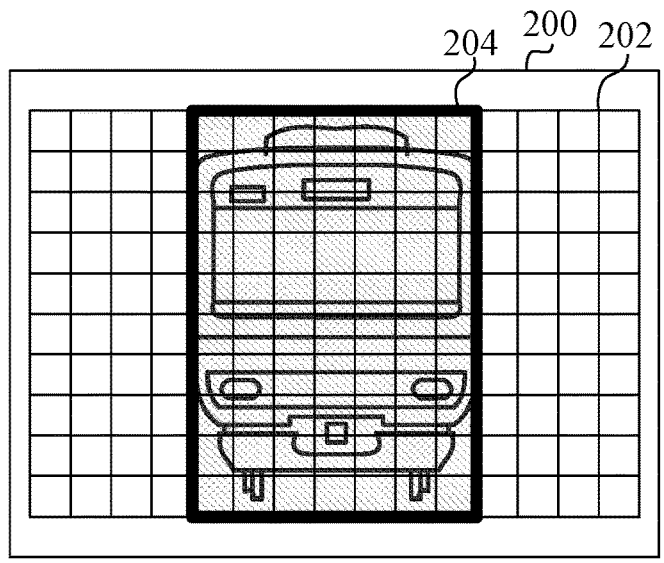

FIGS. 2A to 2C are explanatory diagrams of a method of detecting an object size using a motion vector. For example, as illustrated in FIG. 2A, assume an imaging scene in which an object 201 located at the center of an imaging view angle 200 is approaching to the user. Then, as illustrated in FIG. 2B, vectors detected by a vector detection frame 202 disposed for the imaging view angle 200 are classified into two types. One type is a vector in an object vector region 203 corresponding to part of the object 201 and the other type is a vector in a background vector region corresponding to background part (a region other than the object vector region 203 in the vector detection frame 202).

As the object 201 approaches to the user, the relationship between the object 201 and the vector in the image data changes as illustrated in FIGS. 2B and 2C. In other words, the object vector region 203 turns into an object vector region 204, and the ratio of the object vector region 204 in the vector detection frame 202 increases. More specifically, the number of regions in the horizontal direction of the object vector region 203 in FIG. 2B is 3 whereas the number of regions in the horizontal direction of the object vector region 204 in FIG. 2C is 7. Thus, the object size and its change in the image data can be detected based on the size of the object vector region and its change. The object size information detected by the object size detection unit 20 will now be referred to as detected object size information.

First Embodiment

Figure 3A:
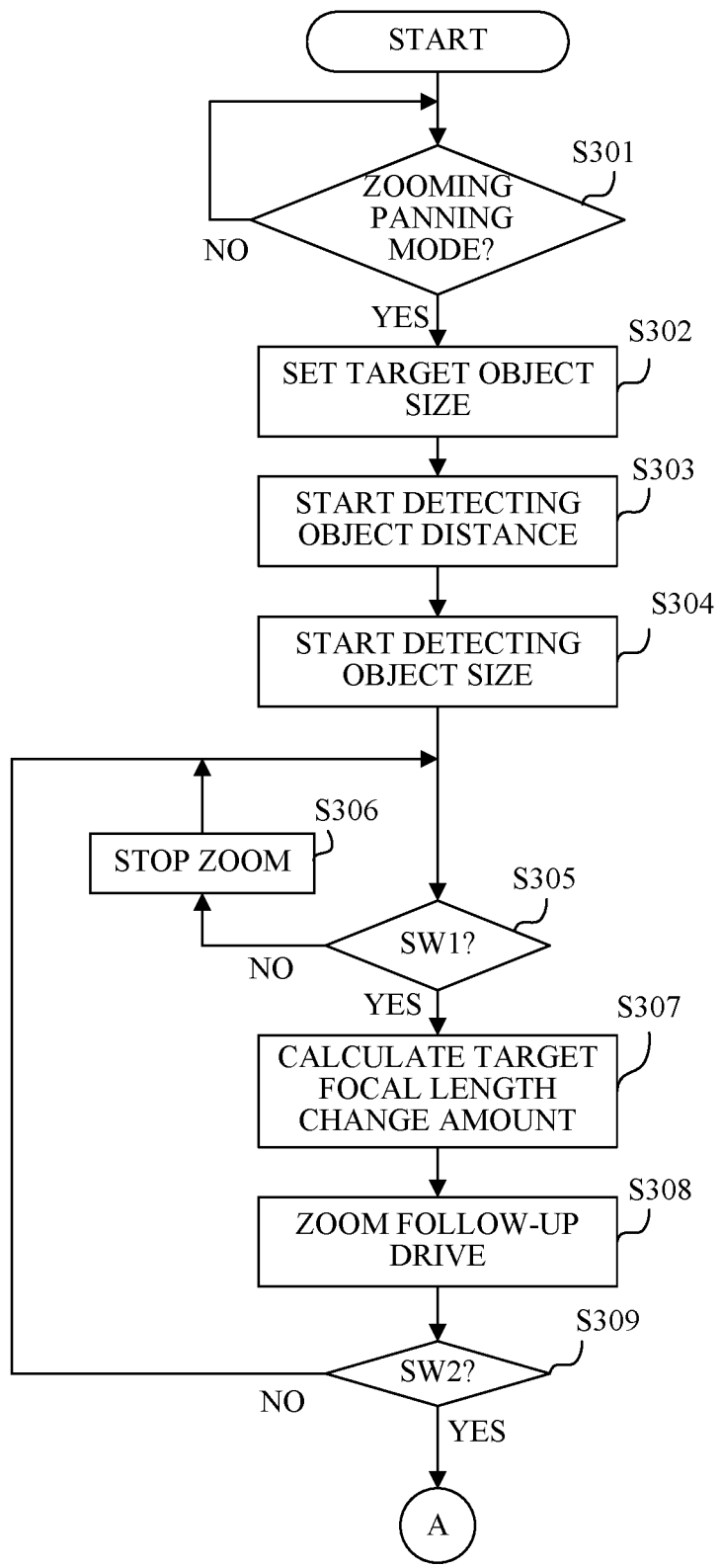
FIGS. 3A and 3B illustrate a flowchart of an imaging sequence of zooming panning according to a first embodiment.
Figure 3B:
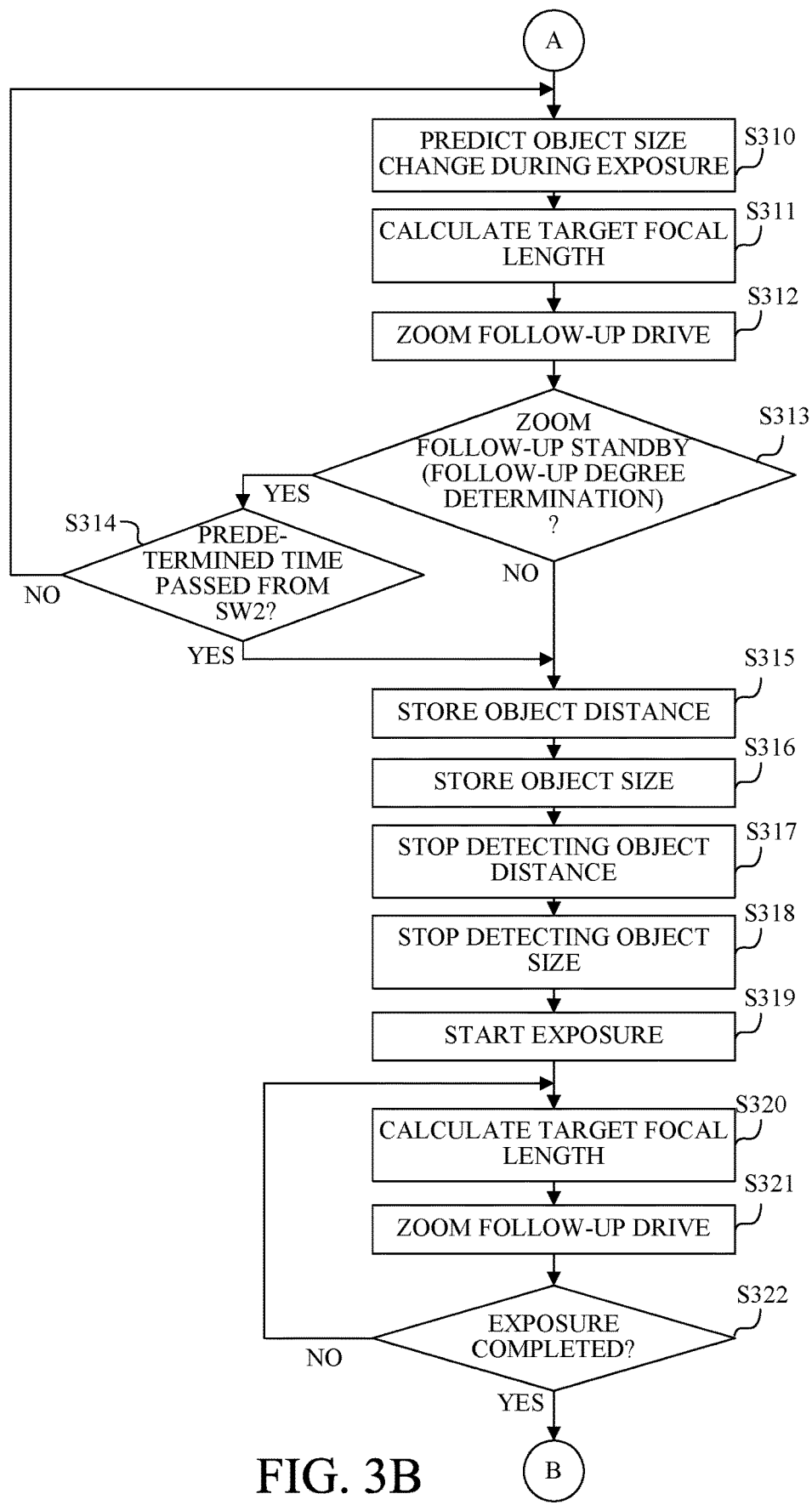

Referring now to FIGS. 3A and 3B, a description will be given of the operation of the zooming panning (first zooming panning) in the imaging apparatus 1 in the first embodiment. FIGS. 3A and 3B illustrate a flowchart of the operation (imaging sequence) of the zooming panning. Each step in FIGS. 3A and 3B is executed by the system control unit 10 in accordance with the program stored in the memory 17.

When the power supply is turned on, the imaging apparatus 1 enters an operation instruction standby state waiting for the operation of the operation switch 14 by the user, after various initialization processing and the like are performed. First, in the step S301, the system control unit 10 determines whether or not there is an instruction to execute the zooming panning mode through the user operation of the operation switch 14. In response to the instruction to execute the zooming panning mode, the flow proceeds to the step S302. If there is no instruction to execute the zooming panning mode, the system control unit 10 continues the determination in the step S301.

In the step S302, the system control unit 10 acquires the target object size (target size information) as the size of the target object from the memory 17. The target size information means an object size to be targeted in maintaining constant the size of the object in the image data in the zooming panning. This embodiment previously stores as a fixed value the target size information in the memory 17 in the imaging apparatus 1. However, the present invention is not limited to this embodiment. For example, a plurality of target size information may be stored in the memory 17 in advance so that the user can arbitrarily select one of them. Alternatively, depending on the distance and speed of the object, the imaging apparatus 1 automatically selects or calculates the target size information in capturing an image, and drives the zooming lens 2a via the zoom control unit 9 so as to maintain the object size as the target object size.

Next, in the step S303, the system control unit 10 starts detecting the object distance (object distance information) using the object distance detection unit 19. This embodiment detects the object distance information based on the phase difference between the signals obtained by dividing the light incident from the optical system 2 into two directions using the image sensor 4 having the function of the phase difference sensor. Thus, whenever the image sensor 4 captures the image data to be displayed on the image display unit 13 after the object distance detection unit 19 starts detecting the object distance information in the step S303, the latest object distance information can be detected. The detected latest object distance information includes object distance detection time information indicating time when the object distance is detected, and these pieces of information are stored in the internal memory 11.

Next, in the step S304, the system control unit 10 starts detecting the object size information using the object size detection unit 20. This embodiment detects the object size information based on a motion vector (motion vector information). After the object size detection unit 20 starts detecting the object size information in the step S304, the latest object size information can be detected based on the difference between at least two consecutive image data captured by the image sensor 4 for display on the image display unit 13. The latest detected object size information contains object size detection time information meaning the time when the object size was detected, and these pieces of information are stored in the internal memory 11. The detection of the object size information is periodically repeated after the step S304 and accumulated in the internal memory 11.

Next, in the step S305, the system control unit 10 determines whether there is an instruction of the SW1 (imaging preparation start instruction) through the user operation of the release switch 15. If the SW1 is not instructed, the flow proceeds to the step S306. If it is determined in the step S308 described later that the zoom control unit 9 has already performed the zoom follow-up drive, the system control unit 10 stops the zoom panning drive in the step S306 and returns to the step S305. If there is an instruction of the SW1, the flow proceeds to the step S307.

In the step S307, the system control unit 10 calculates a target focal length change amount required for the object size on the image data to coincide with the target object size. The target focal length change amount is a difference between the current focal length and the focal length necessary for the object size on the image data to coincide with the target object size. More specifically, the system control unit 10 calculates target focal length change amount using the latest detected object size information detected by the object size detection unit 20, the target size information acquired in the step S302, and the current focal length information calculated by the zoom control unit 9.

In general, the relational expression between the focal length and the object size on the image data is expressed by the following expression (1). For simplicity purpose, assume that the object on the image data has the size in the horizontal direction.

$$\text{focal length (mm)} = \frac{\text{object distance (m)} \times \text{object size on image data (mm)}}{\text{width of object (m)}} \quad (1)$$

Since the target object is always the same object in the sequence of zooming panning, the width of the object in the expression (1) can be defined as a fixed value. In an instant event, the object distance is also unchanged and its value can be defined as a fixed value. In other words, the target focal length change amount can be calculated using the following expression (2).

$$\text{target focal length change amount (mm)} = \quad (2)$$
$$\text{focal length (mm)} - \frac{\text{focal length (mm)} \times \text{target object size (mm)}}{\text{object size on image data (mm)}}$$

Next, in the step S308, the system control unit 10 provides the follow-up drive of the zoom lens 2a (zoom follow-up drive) using the zoom control unit 9 by the target focal length change amount calculated in the step S307. Next, in the step S309, the system control unit 10 determines whether or not there is an instruction of the SW2 (imaging start instruction) through the user operation of the release switch 15. If there is no instruction of the SW2, the flow returns to the step S305. If there is an instruction of the SW 2, the flow proceeds to the step S310.

In the step S310, the system control unit 10 predicts an object size change during exposure. In other words, during a time period from when the object size detection starts in the step S304 to when the step S310 is executed, the system control unit 10 predicts the object size change after the step S310, based on the history of the detected object size information. In this embodiment, the system control unit 10 extracts an arbitrary number of (such as ten) pieces of detected object size information and the object size detection time information from the latest detected object size information among the detected object size information detected until the step S310 is executed. The system control unit 10 predicts the object size change after the step S310 is executed, by approximating the plurality of pieces of information by the least squares method.

Next, in the step S311, the system control unit 10 calculates predicted object size information when step S311 is executed, based on the object size change predicted in the step S310. Then, the system control unit 10 calculates a target focal length used for the predicted object size to coincide with the target object size. The target focal length can be calculated based on the calculated predicted object size information, the target size information acquired in the step S302, and the focal length information calculated by the zoom control unit 9 when the step S311 is executed. The focal length when the step S311 is executed may be multiplied by a ratio between the target object size and the predicted object size (the target object size divided by the predicted object size). Instead of the target focal length, a target focal length change amount may be acquired and the subsequent follow-up drive may be performed based on the target focal length change amount.

Next, in the step S312, the system control unit 10 performs the follow-up drive of the zoom lens 2a using the zoom control unit 9 so as to obtain the target focal length calculated in the step S311. Next, in the step S313, the system control unit 10 determines whether the zoom follow-up standby is necessary (follow-up degree). If the zoom follow-up standby is necessary (the follow-up degree is out of predetermined range), the flow proceeds to the step S314. If the zoom follow-up standby is unnecessary (the follow-up degree falls within the predetermined range), the flow proceeds to the step S315.

Figure 6A:
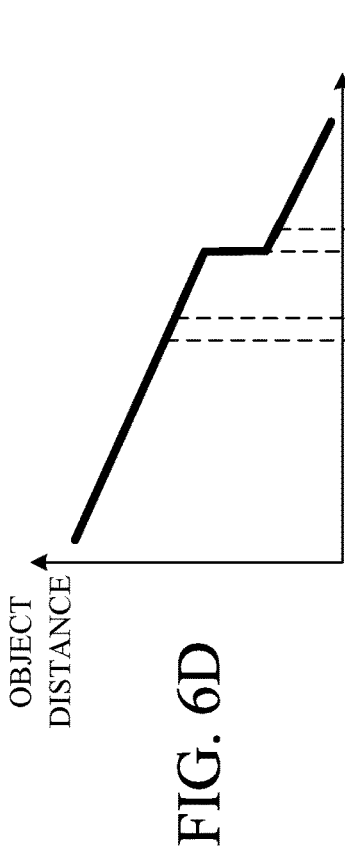
FIGS. 6A to 6F are explanatory diagrams of zoom follow-up standby processing according to the first embodiment.
Figure 6B:
Figure 6C:
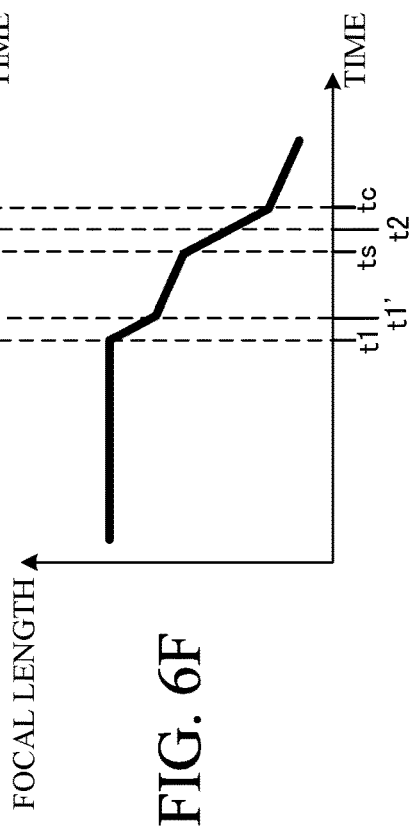

Referring now to FIGS. 6A to 6F, a description will be given of the zoom follow-up standby processing according to this embodiment. FIGS. 6A to 6F are explanatory diagrams of the zoom follow-up standby processing. Referring now to FIGS. 6A, 6B, and 6C, a description will be given of a case where the zoom follow-up standby is unnecessary. FIG. 6A is an illustrative object distance change in the zooming panning. FIG. 6B is an illustrative object size change in the zooming panning. FIG. 6C is an illustrative focal length change in the zooming panning.

In FIGS. 6A, 6B, and 6C, the abscissa axis shows time (same time base), t1 is a timing at which the SW1 is turned on by the user, and t2 is a timing at which the SW2 is turned on by the user. Now assume that the object as a target of the zooming panning is an object moving at a constant speed in a direction approaching to the imaging apparatus 1. As illustrated in FIG. 6A, the object distance change monotonically decreases in proportion to the time.

A description will now be given of the movement up to the timing t1 along the zooming panning sequence according to this embodiment. Since the zoom follow-up control is not performed up to the timing t1, the focal length is fixed to F0. In other words, the focal length is a fixed value F0 up to the timing t1 and the object distance monotonically decreases. Therefore, the object size on the image data increases in inverse proportion to the decrease in the object distance.

Next, as the zoom follow-up drive in the zooming panning is executed at the timing t1, the system control unit 10 uses the zoom control unit 9 to make the object size on the image data coincide with the target object size to provide the follow-up drive of the zoom lens 2a and to change the focal length. Due to the focal length change by the zoom follow-up control, it takes a time for the object size on the image data to coincide with the target object size. Strictly speaking, the object size coincides with the target object size at a timing t1'.

After the timing t1', the system control unit 10 changes the focal length using the zoom control unit 9 so that the latest detected object size detected by the object size detection unit 20 and the target object size coincide with each other, and waits for the timing t2. In this embodiment, the object size is maintained constant and the change amount of the object size is 0. Thereafter, at the timing t2, the system control unit 10 changes the focal length using the zoom control unit 9, and determines whether a difference between the latest detected object size information and the target size information at the time falls within a predetermined range.

When the difference between the latest detected object size information and the target size information falls within the predetermined range, the system control unit 10 performs the exposure as it is. If the difference does not fall within the predetermined range, the system control unit 10 further changes the focal length using the zoom control unit 9 so that the detected object size information and the target size information coincide with each other and continues to determine whether or not the difference falls within the predetermined range. In the case of FIG. 6B, at the timing t2, the latest detected object size information coincides with the target size information or the difference falls within the predetermined range, so the exposure is performed as it is.

Figure 6D:
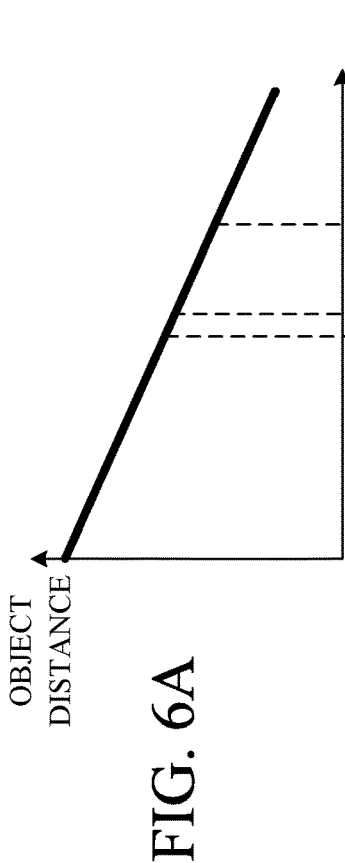
Figure 6E:
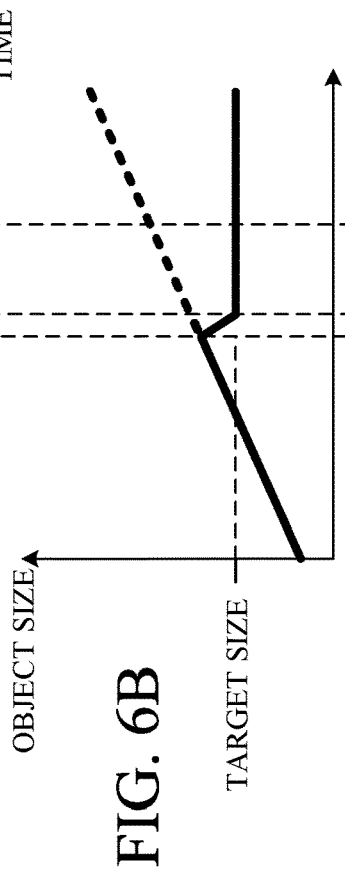
Figure 6F:
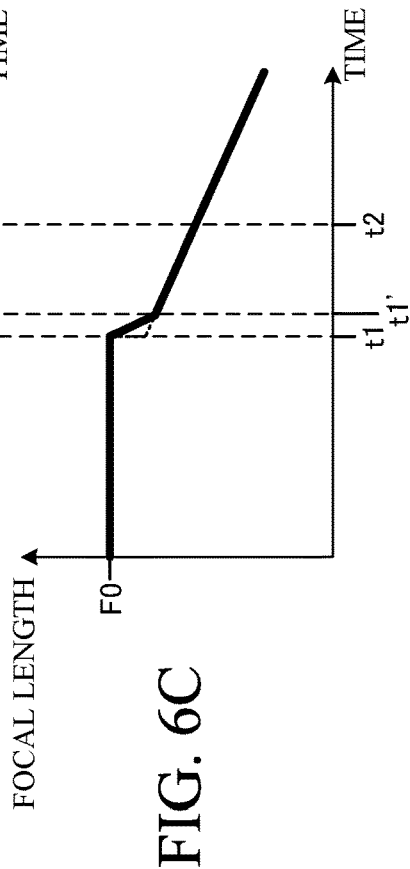

Referring now to FIGS. 6D, 6E, and 6F, a description will be given of the zoom follow-up standby processing determined necessary. FIG. 6D is an illustrative object distance change in the zooming panning. FIG. 6E is an illustrative object size change in the zooming panning. FIG. 6F is an illustrative focal length change in the zooming panning. In FIGS. 6D, 6E, and 6F, the abscissa axis is time (same time base). The timing t1 is the timing at which the SW1 is turned on by the user, and the timing t2 is the timing at which the SW2 is turned on. Now assume that an object as a target of the zooming panning is moving in a direction approaching to the imaging apparatus 1.

A description will now be given of the movement up to the timing t1 along the zooming panning sequence according to this embodiment. Since the zoom follow-up control is not performed up to the timing t1, the focal length is fixed to F0. At the timing t1, the object is moving at the constant speed in the direction approaching to the imaging apparatus 1. In other words, the focal length is a fixed value F0 up to the timing t1 and the object distance monotonically decreases. Therefore, the object size on the image data increases in inverse proportion to the decrease in the object distance.

Next, when the zoom follow-up drive in the zooming panning is executed at the timing t1, the system control unit 10 uses the zoom control unit 9 for the follow-up drive of the zoom lens 2a and changes the focal length so that the object size on the image data coincides with the target object size. Due to the focal length change by the zoom follow-up control, it takes a time for the object size on the image data to coincide with the target object size. Strictly speaking, the object size coincides with the target object size at timing t1'.

After the timing t1', the system control unit 10 changes the focal length using the zoom control unit 9 so that the latest detected object size detected by the object size detection unit 20 and the target object size coincide with each other and waits for the timing t2. Now assume that the moving speed of the object significantly changes (in the acceleration direction) at a timing is earlier than the timing t2, and the object distance sharply changes as illustrated in FIG. 6D. In this case, the object size on the image data suddenly increases, and temporarily becomes a state where it does not coincide with the target object size or an unfollowable state.

Thereafter, the system control unit 10 drives the zoom lens 2a using the zoom control unit 9 and changes the focal length so that the object size on the changed image data coincides with the target object size. When the predetermined time elapses (at a timing tc), the object size and the target object size again coincide with each other.

If the user instructs the SW2 between the timing ts and the timing tc or when the timing t2 occurs at the timing as illustrated in FIG. 6F, the object size on the image data and target object size do not coincide with each other. When the exposure is started as it is, the exposure proceeds while the object size on the image data is changing and the captured image becomes an image having a blurred outline of the object (or a badly follow-shot image).

Accordingly, as described above, the system control unit 10 in this embodiment changes the focal length through the zoom control unit 9 at the timing t2, and determines whether or not the difference between the latest detected object size information and the target size information at that time falls within a predetermined range. When the difference falls within the predetermined range, the change amount of the current object size is a predetermined value or less and it is presumed that the object size change during the exposure can be suppressed to a predetermined value or less. Therefore, the system control unit 10 performs exposure as it is. If the difference does not fall within the predetermined range, the system control unit 10 further changes the focal length using the zoom control unit 9 so that the detected object size coincides with the target size, and continues to determine whether the difference falls within the predetermined range. In the example of FIG. 6E, since the difference between the latest detected object size and the target size does not fall within the predetermined range at the timing t2, the system control unit 10 does not perform the exposure as it is. As understood from the timing ts to the timing tc in FIG. 6E, when the difference between the detected object size and the target size is outside the predetermined range (larger than the predetermined value), the current object size change amount is also larger than the predetermined value. Thus, it is presumed that when the exposure is performed at this timing, the object size change during the exposure also becomes larger than the predetermined value.

Referring now to FIGS. 6A to 6F, a description will be given of the zoom follow-up standby processing according to this embodiment. In this embodiment, the system control unit 10 makes a determination depending on whether or not the difference between the latest detected object size information and the target size information falls within a predetermined range. However, the present invention is not limited to this embodiment. For example, the system control unit 10 may determine that the zoom follow-up standby processing is necessary at the timing t2, when the object distance changing trend (in the object speed) does not converge within a predetermined range (or it is not a constant speed) by acquiring the past object distance changing trend, because the change amount of the object size at the timing t2 is presumably larger than the predetermined amount.

This embodiment previously stores the predetermined range in the memory 17 in the imaging apparatus 1 as a fixed value, but the present invention is not limited to this embodiment. For example, a plurality of prescribed ranges may be previously stored in the memory 17 so that the user can arbitrarily select any one of them and determine which one of the imaging duration and the follow-up accuracy is to be prioritized. This embodiment may change the range according to the exposure time period (so-called shutter speed). For example, when the exposure time period is long, the predetermined range is changed narrower. This is because, for example, where a ratio of a follow-up delay time when the exposure starts is small in the sufficiently long exposure time period, so that it may not significantly affect the image captured by the zooming panning.

Where the follow-up degree is low or the object size on the image is significantly changed due to the delay of the follow-up drive of the zoom lens as the object size changes, the system control unit 10 according to this embodiment does not immediately start the exposure even when receiving the imaging instruction. Thereby, the exposure is less likely to start when the zoom lens cannot follow the object movement.

In the step S314 in FIG. 3B, the system control unit 10 determines whether the time period from when the instruction of the SW2 from the user is executed in the step S309 to when the step S314 is executed exceeds the predetermined time period t (the predetermined time t has elapsed since the SW2). If the time period exceeds the predetermined time period t, the flow proceeds to the step S315. If the time period has not exceeded the predetermined time period t, the flow returns to the step S310 to continue the process. In other words, when the time period during which it is determined that the zoom follow-up standby is necessary in the step S313 is less than the predetermined time period t, the system control unit 10 repeatedly executes the processing in the steps S310 to S312.

In the step S315, the system control unit 10 stores as the last imaging object distance information in the internal memory 11 the latest information among the object distance information detected from when the detection of the object distance starts in the step S303 to when the step S315 is executed. Next, in the step S316, the system control unit 10 stores as the last imaging object size information in the memory 11 the latest information among the detected object size information detected from when the detection of the object size starts in the step S304 to when the step S316 is executed.

Next, in the step S317, the system control unit 10 stops detecting the object distance information through the object distance detection unit 19. Next, in the step S318, the system control unit 10 stops detecting the object size information through the object size detection unit 20. Next, in the step S319, the system control unit 10 starts the exposure (imaging).

Next, in the step S320, the system control unit 10 calculates the predicted object size when the step S320 is executed, based on the object size change predicted in the step S310. Then, the system control unit 10 calculates a target focal length necessary for the predicted object size to coincide with the target object size. The target focal length is calculated based on the calculated predicted object size information, the target size information acquired in the step S302, and the focal length information calculated by the zoom control unit 9 when the step S320 is executed.

Next, in the step S321, the system control unit 10 performs the follow-up drive of the zoom lens 2a through the zoom control unit 9 so as to obtain the target focal length calculated in the step S320. Next, in the step S322, the system control unit 10 determines whether or not the exposure started in the step S319 has been completed. When the exposure is completed, the procedure shifts to the zooming panning continuous-imaging sequence described later. If the exposure has not been completed, the flow returns to the step S320 to continue the processing. In other words, while the exposure started in the step S319 continues, the system control unit 10 realizes the zoom driving during exposure by repeatedly executing the processing in the steps S320 and S321.

Thus, in the zooming imaging sequence according to this embodiment, the system control unit 10 performs the zoom follow-up control at the timing of the SW1 so that the latest detected object size and the target object size coincide with each other, and starts changing the focal length. Then, at the timing of the SW2, the system control unit 10 changes the timing of executing the exposure (imaging) according to the difference between the latest detected object size and the target object size. Thereby, the zoom follow-up accuracy for maintaining constant the object size during exposure can be improved.

Figure 4A:
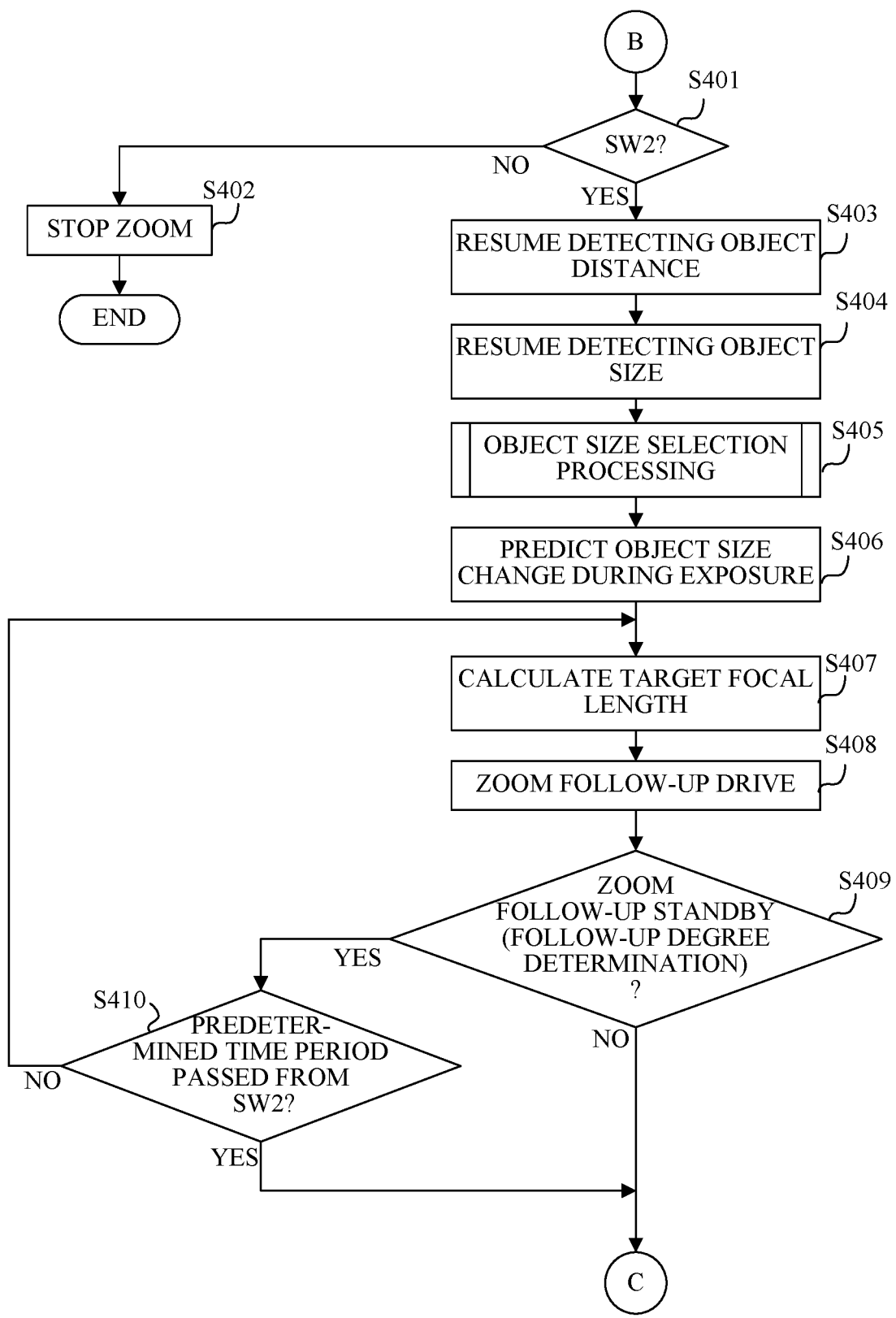
FIGS. 4A and 4B illustrate a flowchart of a continuous imaging sequence of the zooming panning according to the first embodiment.
Figure 4B:
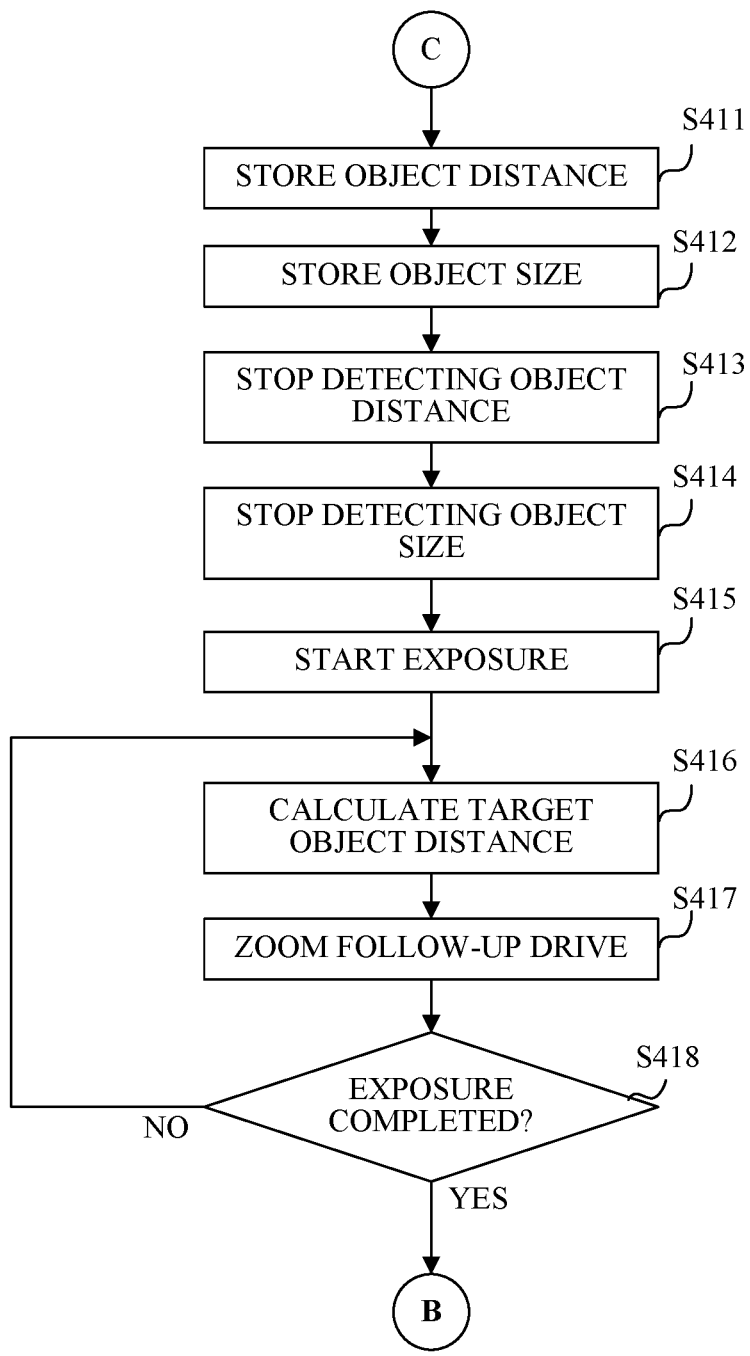

Referring now to FIGS. 4A and 4B, a description will be given of the operation of the zooming panning continuous-imaging of the imaging apparatus 1. FIGS. 4A and 4B illustrate a flowchart of the operation (continuous imaging sequence) of the zooming panning. Each step in FIGS. 4A and 4B is executed by the system control unit 10 in accordance with a program stored in the memory 17.

The imaging apparatus 1 proceeds to the step S401 following the completion of the above zooming panning sequence. In the step S401, the system control unit 10 determines whether there is an instruction of the SW2 (imaging continuation instruction) through the user operation of the release switch 15. When there is an instruction of the SW2, the flow proceeds to the step S403. If there is no instruction of the SW2, the flow proceeds to the step S402.

If it is determined in the step S402 that the zoom control unit 9 has already performed the zoom follow-up drive in the above zooming panning sequence, the system control unit 10 stops the zoom follow-up drive and performs zooming panning continuous-imaging sequence.

In the step S403, the system control unit 10 restarts detecting the object distance information through the object distance detection unit 19 stopped in the step S317 of the above zooming panning sequence or in the step S413 described later. Next, in the step S404, the system control unit 10 restarts detecting the object size information through the object size detection unit 20 stopped in the step S318 of the above zooming panning sequence or the step S414 described later. Next, in the step S405, the system control unit 10 executes the object size selection processing that determines whether to acquire object size information in the zooming panning continuous-imaging sequence from any one of two methods (first method and second method) described later.

Figure 5:
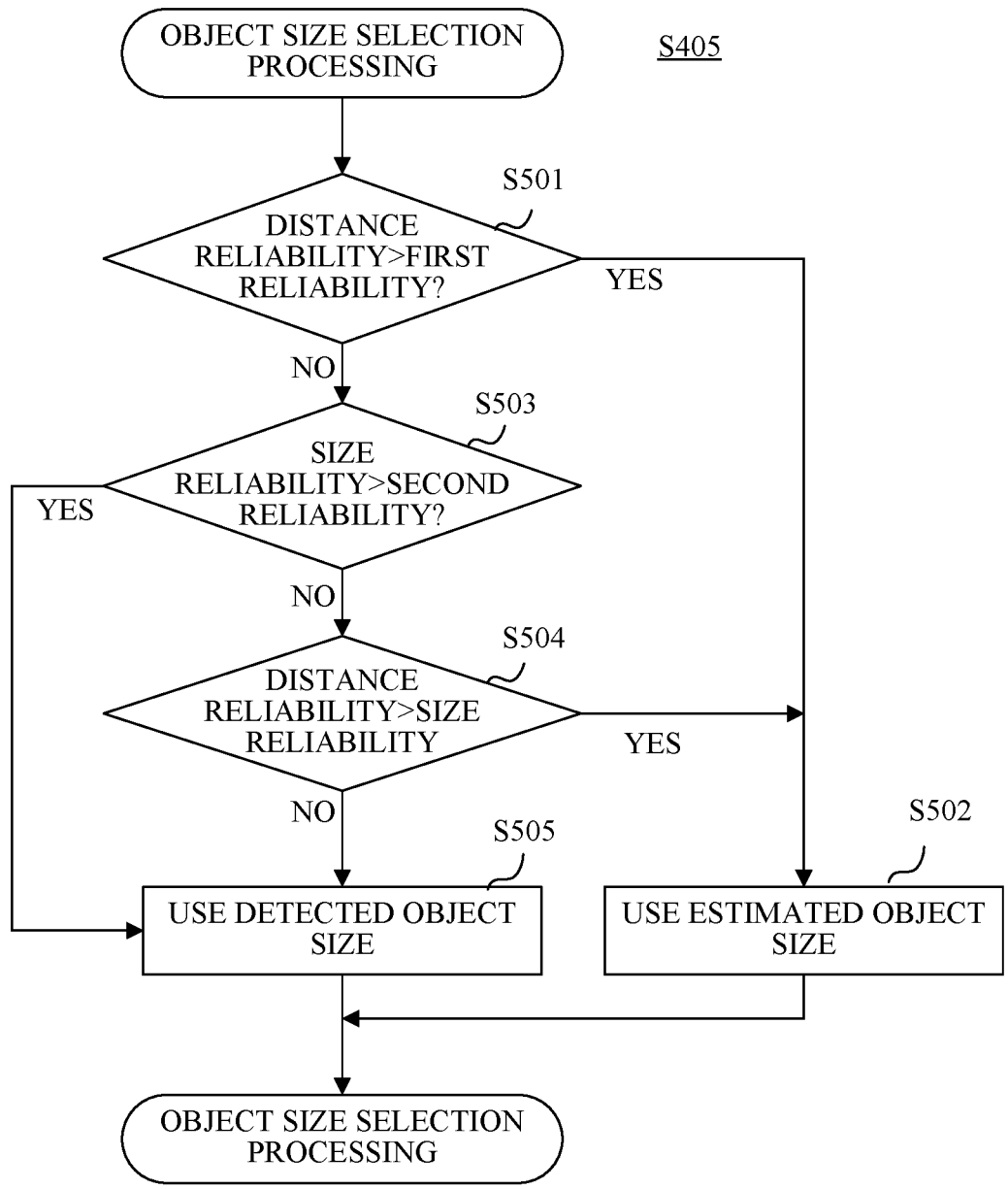
FIG. 5 is a flowchart of an object size selection processing sequence according to the first embodiment.

Referring now to FIG. 5, a description will be given of the object size selection processing (object size selection processing sequence) in the zooming panning continuous-imaging sequence. FIG. 5 is a flowchart of the object size selection processing sequence (step S405). Each step in FIG. 5 is executed by the system control unit 10 in accordance with a program stored in the memory 17.

First, in the step S501, the system control unit 10 determines the reliability (distance reliability) of the object distance information. In this embodiment, the system control unit 10 determines the reliability of the object distance based on the difference between the latest object distance information and the predicted object distance information. Herein, the latest object distance information is the latest object distance information in the object distance information detected from when the detection of the object distance is resumed in the step S403 to when the step S501 is executed. The predicted object distance information is the predicted object distance information in the step S501 estimated from the object distance information in the last exposure (step S315 or S411 described later). In this embodiment, the reliability is higher as the difference is smaller between the latest object distance information and the predicted object distance information. In other words, in the step S501, if the reliability of the object distance (distance reliability) is higher than the first reliability (first threshold) previously stored in the memory 17, the flow proceeds to the step S502. When the reliability of the object distance is lower than the first reliability (first threshold), the flow proceeds to the step S503.

In the step S502, the system control unit 10 estimates the object size based on the latest object distance information acquired in the step S501 and the object distance information in the last exposure (step S315 or S411 described later). A description will now be given of a method of estimating the object size from the object distance information. In general, the object size on the image data is expressed by the following expression (3).

$$\text{object size on image data} = \frac{\text{focal length (mm)} \times \text{width of object (m)}}{\text{object distance }(m)} \quad (3)$$

Since the target object is always the same object in the zooming panning continuous-imaging sequence, the width of the object in the expression (3) can be defined as a fixed value. Thus, the relational expression between the object distance information in the last exposure (step S315 or S411 described later) and the latest object distance information on the image data is expressed by the following expression (4).

$$\frac{\text{object size in the last exposure (mm)} \times \text{object distance in the last exposure (m)}}{\text{focal length in the last exposure (mm)}} = \quad (4)$$

$$\frac{\text{the latest object size (mm)} \times \text{the latest object distance (m)}}{\text{the latest focal length(mm)}}$$

In other words, the latest object size can be estimated using the following expression (5).

$$\text{The latest object size (mm)} = \quad (5)$$

$$\frac{\text{object size in the last exposure (mm)} \times \text{object distance in the last exposure (m)} \times \text{the latest focal length (mm)}}{\text{focal length in the last exposure (mm)} \times \text{the latest object distance (m)}}$$

Thus, in the step S502, the system control unit 10 selects as the object size information the object size (estimated object size information) estimated using the expression (5). In this step, unlike the detection of the object size information in the step S304, since a plurality of image data are not required, the object size information can be acquired earlier than the method in the step S304 (and a time period from the imaging end (S322) to the acquisition of the object size can be made shorter).

In the step S503, the system control unit 10 determines the reliability of the detected object size information. In this embodiment, the system control unit 10 determines the reliability of the detected object size based on the difference between the latest detected object size information and the predicted object size information. Herein, the latest detected object size information is the latest detected object size information among the detected object size information detected from when the detection of the object size is resumed in the step S404 to when the step S503 is executed. The predicted object size information is the predicted object size information in the step S503 estimated from the object size information in the last exposure (step S316 or S412 described later). In this embodiment, the smaller the difference is between the latest detected object size information and the predicted object size information, the higher the reliability is. In other words, in the step S503, if the reliability of the object size is higher than the second reliability (second threshold) previously stored in the memory 17, the flow proceeds to the step S505. If the reliability of the object distance is lower than the second reliability (second threshold), the flow proceeds to the step S504.

In the step S504, the system control unit 10 determines whether the reliability of the object distance information calculated in the step S501 is higher than the reliability of the object size information calculated in the step S503. When the reliability of the object distance information is higher than the reliability of the object size information, the flow proceeds to the step S502. When the reliability of the object distance information is lower than the reliability of the object size information, the flow proceeds to the step S505. In the step S505, the system control unit 10 selects the latest detected object size information acquired in the step S503 as the object size information.

Next, in the step S406 in FIG. 4A, the system control unit 10 predicts an object size change during the exposure (object size change after the step S406 is executed). In other words, the system control unit 10 predicts the object size change based on any new information of the object size information stored in the internal memory 11 in the step S316 or S411 and the object size information selected in the step S405. In this embodiment, the system control unit 10 predicts the object size change after the step S406 is executed by linearly approximating them.

Next, in the step S407, the system control unit 10 calculates the predicted object size when the step S407 is executed based on the object size change predicted in the step S406. Then, the system control unit 10 calculates a target focal length necessary for the predicted object size to coincide with the target object size. In this embodiment, the target focal length is calculated based on the predicted object size information, the target size information acquired in the step S302, and the focal length information calculated by the zoom control unit 9 when the step S407 is executed.

Next, in the step S408, the system control unit 10 performs the follow-up drive of the zoom lens 2*a* through the zoom control unit 9 so as to obtain the target focal length calculated in the step S407. Next, in the step S409, the system control unit 10 determines whether or not the zoom follow-up standby is necessary (follow-up degree). Where the zoom follow-up standby is necessary (when the follow-up degree falls out of the predetermined range), the flow proceeds to the step S410. When the zoom follow-up standby is unnecessary (when the follow-up degree falls within the predetermined range), the flow proceeds to the step S411. The zoom follow-up standby is the same as the above step S313.

This embodiment executes the zooming follow-up standby in the step S409, but the present invention is not limited to this embodiment. For example, in order to shorten the time required for the zooming panning continuous-imaging sequence (the imaging time per a single image (frame rate) in the continuous imaging), the zoom follow-up standby may be omitted. Alternatively, the user may select whether or not to execute the zoom follow-up standby in the zooming panning continuous-imaging sequence.

In the step S410, the system control unit 10 determines whether or not a time period from when the user instruction of the SW2 is executed in the step S401 to when the step S410 is executed exceeds a predetermined time period t (the predetermined time has elapsed since the SW2 operation). If this time period exceeds the predetermined time period t, the flow proceeds to the step S411. If this time period does not exceed the predetermined time period t, the flow returns to the step S407 to continue the processing. In other words, the system control unit 10 repeatedly executes the processing of the steps S406 and S407 as long as the time period during which the zoom follow-up standby is determined necessary in the step S409 is less than the predetermined time period t.

In the step S411, the system control unit 10 stores in the internal memory 11 the latest object distance information among the object distance information detected from when the detection of the object distance is resumed in the step S403 to when the step S411 is executed. Next, in the step S412, the system control unit 10 stores the object size information selected in the step S405 in the internal memory 11. Next, in the step S413, the system control unit 10 stops detecting the object distance information through the object distance detection unit 19. Next, in the step S414, the system control unit 10 stops detecting the object size information through the object size detection unit 20. Next, in the step S415, the system control unit 10 starts the exposure (imaging).

Next, in the step S416, the system control unit 10 calculates the predicted object size when the step S416 is executed based on the object size change predicted in the step S406. Then, the system control unit 10 calculates a target focal length necessary for the predicted object size to coincide with the target object size. In this embodiment, the target focal length is calculated based on the predicted object size information, the target size information acquired in the step S302, and the focal length information managed by the zoom control unit 9 when the step S416 is executed.

Next, in the step S417, the system control unit 10 performs the follow-up drive of the zoom lens 2*a* via the zoom control unit 9 to obtain the target focal length calculated in the step S416. Next, in the step S418, the system control unit 10 determines whether or not the exposure started in the step S415 has been completed. If the exposure is completed, the flow returns to the step S401 and the system control unit 10 again executes the zooming panning continuous-imaging sequence. If the exposure has not been completed, the flow returns to the step S416 to continue the processing. In other words, while the exposure started in the step S415 is continued, the system control unit 10 realizes the zoom follow-up drive during the exposure by repeatedly executing the processing in the steps S416 and S417.

As described above, this embodiment selects or determines the object size information acquired by the two methods for use with the zoom follow-up drive of the next imaging according to the reliabilities of the object distance information and the object size information in the zooming continuous-imaging sequence. The object size information acquired by the two methods is the estimated object size information estimated from the object distance information and the detected object size information detected by the object size detection unit 20. Thereby, the accuracy of the object size information used for the zoom follow-up drive can be higher than that using only the detected object size information detected by the object size detection unit 20.

When a time period necessary for the object distance detection unit 19 to detect the object distance is shorter than a time period necessary for the object size detection unit 20 to detect the object size, the estimated object size information estimated from the object distance information detected by the object distance detection unit 19 may be used. As a result, it becomes possible to shorten a time period necessary for the zooming panning continuous-imaging sequence (imaging time (frame rate) per a single image in the continuous imaging).

Thus, the control apparatus (system control unit 10) in this embodiment includes an information acquisition unit 10*a* and an imaging control unit 10*b*. The information acquisition unit 10*a* acquires the object size information from the image data. The imaging control unit 10*b* performs the exposure while performing the follow-up drive of the optical system 2 so as to reduce the difference between the object size information and the target size information. Alternatively, the imaging control unit 10*b* changes an exposure start timing based on the follow-up degree of the follow-up drive.

The follow-up degree may be information indicating the difference between the object size information and the target size information (a value indicating the difference between the object size information and the target size information) or a ratio (a value indicating a ratio between the object size information and the target size information). The follow-up degree may be information on a difference between the target focal length information and the current focal length information (a value indicating the difference between the target focal length information and the current focal length information) or a ratio (a value indicating the ratio between the target focal length information and the current focal length information). The follow-up degree may be information (a value indicating a change degree of the object distance) on the object distance change (before the exposure starts). The follow-up degree may be a degree obtained using a plurality of these pieces of information. The information acquisition unit acquires object size information based on the motion vector information in the image data.

When the follow-up degree falls within a predetermined range at a predetermined timing (such as the timing t2 in FIGS. 6A to 6F), the imaging control unit may start the exposure, and when the follow-up degree is out of the predetermined range, the imaging control unit may not start the exposure. When the follow-up degree is out of the predetermined range at a predetermined timing, the imaging control unit may start the exposure at a timing (such as the timing tc in FIG. 6E) when the follow-up degree, which has fallen outside the predetermined range, falls within the predetermined range. When the follow-up degree is out of the predetermined range at a predetermined timing, the imaging control unit may perform the follow-up drive based on the object size information acquired by the information acquisition unit before the predetermined timing until the follow-up degree falls within the predetermined range. When the follow-up degree falls out of the predetermined range at the predetermined timing, the imaging control unit may start the exposure when a state of the follow-up degree outside the predetermined range continues for a predetermined time (such as a predetermined time t described in the steps S314 and S410).

The imaging control unit may change the predetermined range according to the exposure time (shutter speed). The predetermined timing may be the imaging instruction timing from the user (the execution timing of the SW2).

Second Embodiment

Figure 7A:
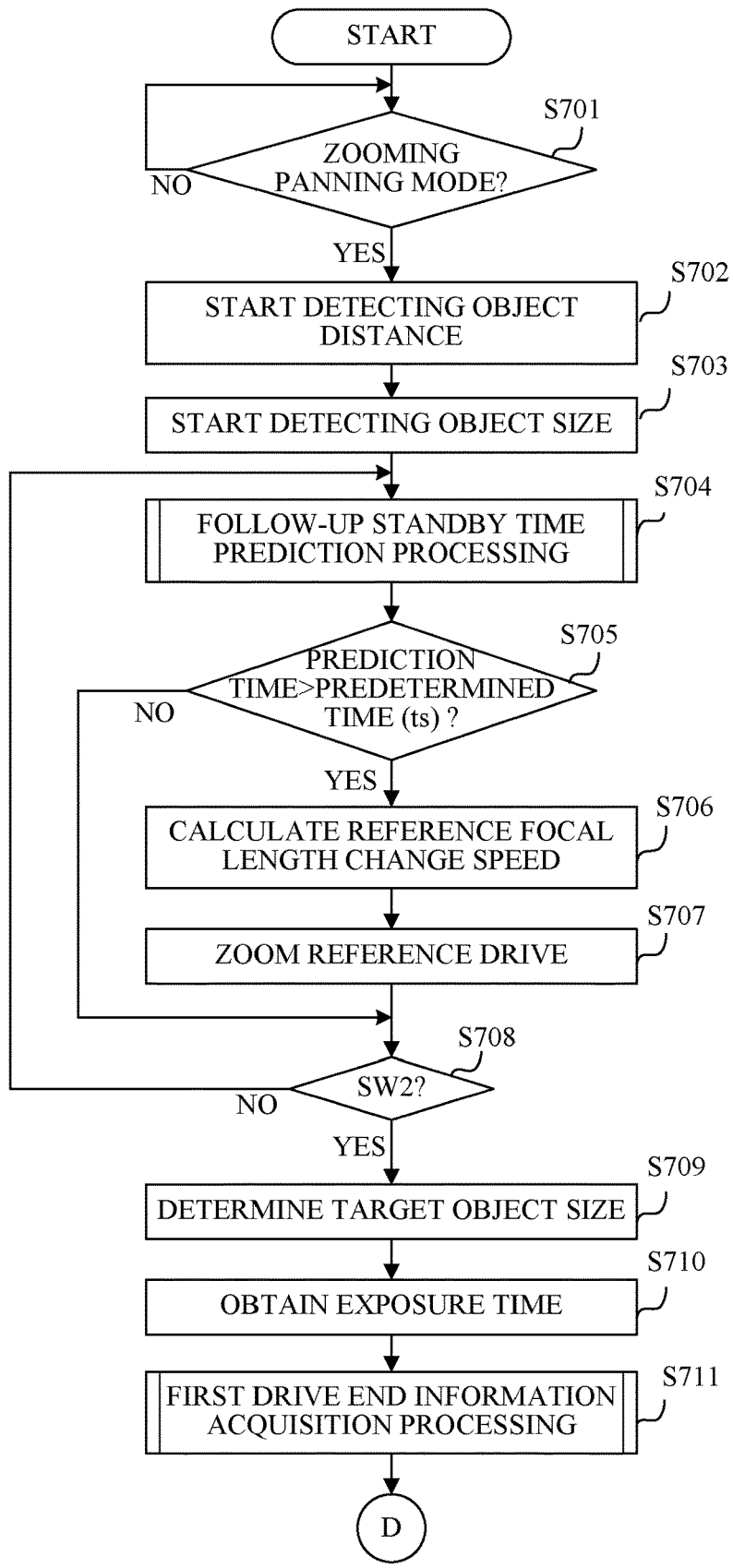
FIGS. 7A and 7B illustrate a flowchart of an imaging sequence of zooming panning according to a second embodiment.
Figure 7B:
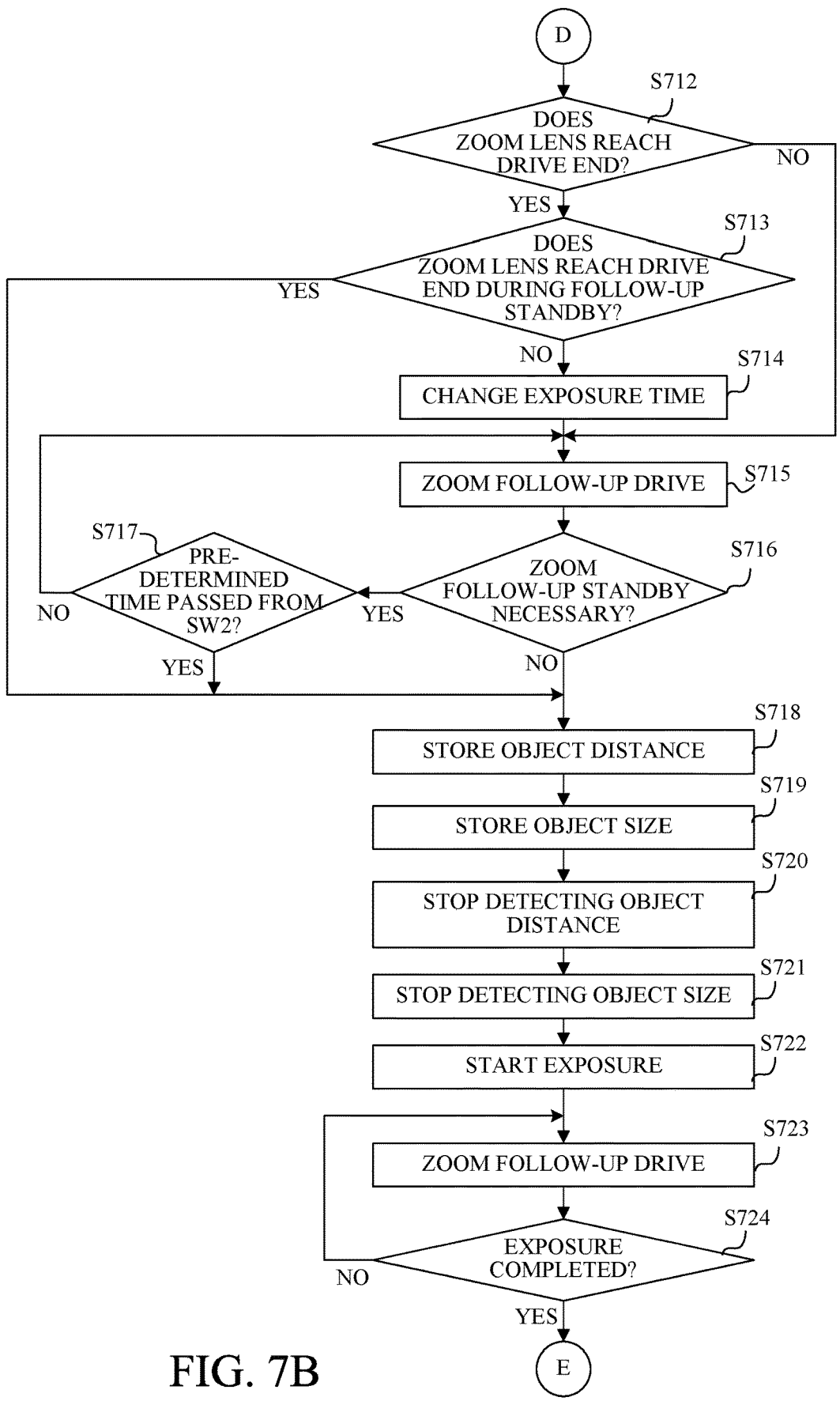

Referring now to FIGS. 7A and 7B, a description will be given of the zooming panning (second zooming panning) operation in the imaging apparatus 1 according to the second embodiment. FIGS. 7A and 7B illustrate a flowchart of the second zooming panning operation (imaging sequence). Each step in FIGS. 7A and 7B is executed by the system control unit 10 in accordance with a program stored in the memory 17.

When the power supply is turned on, the imaging apparatus 1 enters a standby state for an operation instruction through the user operation of the operation switch 14 after performing various initialization processing and the like. First, in the step S701, the system control unit 10 determines whether or not there is an instruction to execute the zooming panning mode through the user operation of the operation switch 14. If there is the instruction to execute the zooming panning mode, the flow proceeds to the step S702. If there is no instruction to execute the zooming panning mode, the system control unit 10 continues the determination in the step S701.

In the step S702, the system control unit 10 starts detecting the object distance (object distance information) using the object distance detection unit 19. This embodiment detects the object distance information detected based on the phase difference between the signals obtained by dividing the light incident from the optical system 2 into two directions using the image sensor 4 having the function of the phase difference sensor. Thus, the latest object distance information can be detected whenever the image sensor 4 captures the image data to be displayed on the image display unit 13 after the object distance detection unit 19 detects the object distance information in the step S702. The latest detected object distance information includes object distance detection time information indicating the time when the object distance is detected, and these pieces of information are stored in the internal memory 11.

Next, in the step S703, the system control unit 10 starts detecting the object size information using the object size detection unit 20. In this embodiment, the object size information is detected based on a motion vector (motion vector information). After the object size detection unit 20 detects the object size information in the step S703, the latest object size information can be detected based on the difference between at least two consecutive image data captured by the image sensor 4 for display on the image display unit 13. The latest detected object size information contains object size detection time information meaning the time when the object size is detected, and these pieces of information are stored in the internal memory 11. The detection of the object size information is periodically repeated after the step S703 and accumulated in the internal memory 11.

Next, in the step S704, the system control unit 10 executes follow-up standby time prediction processing for predicting the zoom follow-up standby time in the zooming panning sequence.

Figure 9:
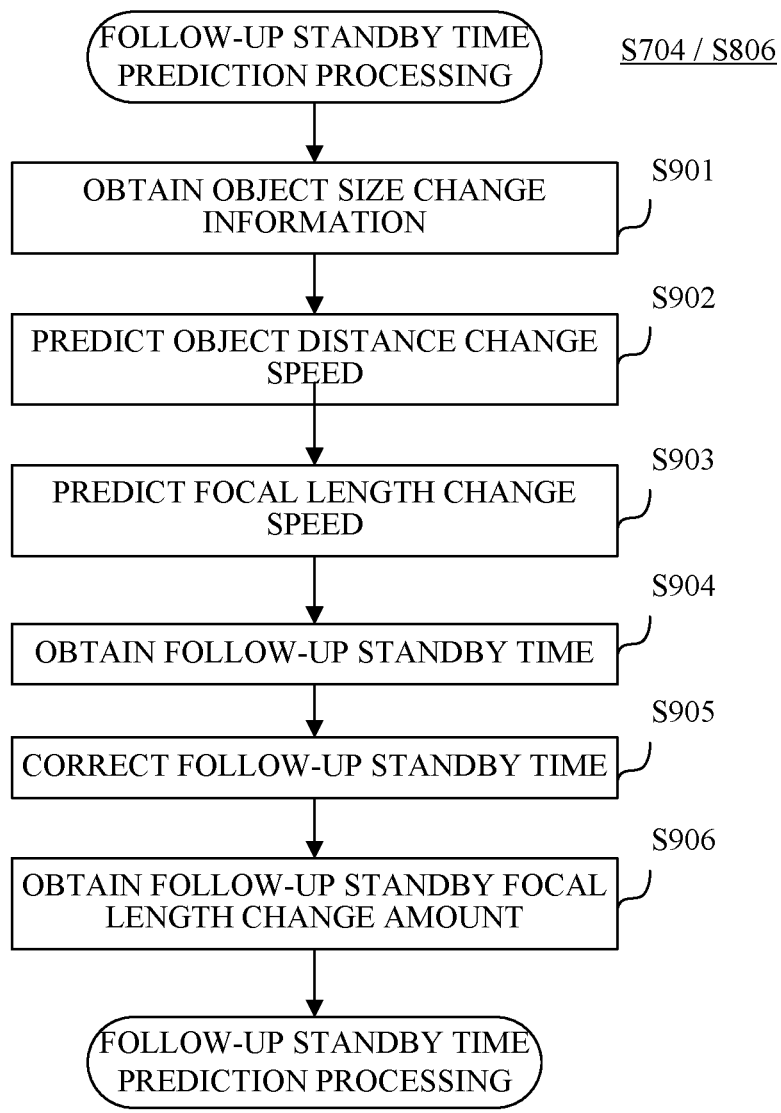
FIG. 9 is a flowchart of a follow-up standby time prediction processing sequence according to the second embodiment.

Referring now to FIG. 9, a description will be given of the follow-up standby time prediction processing (follow-up standby time prediction processing sequence) in the zooming panning sequence. FIG. 9 is a flowchart of the follow-up standby time prediction processing sequence (steps S704 and S806 described later). Each step in FIG. 9 is executed by the system control unit 10 in accordance with a program stored in the memory 17.

First, in the step S901, the system control unit 10 acquires the object size change information. In other words, the system control unit 10 acquires the history of detected object size information detected from when the detection of the object size starts in the step S703 to when the step S901 is executed. In this embodiment, the system control unit 10 obtains an arbitrary number of (such as ten) pieces of detected object size information from the latest detected object size information among the detected object size information detected until the step S901 is executed. In association with each detected object size information, detection time information indicating the detected time and detected focal length information at the detected time are also acquired.

Next, in the step S902, the system control unit 10 acquires the object distance change speed information after the step S902 is executed, based on the detected object size information, the detection time information, and the detected focal length information acquired in the step S901. The relational expression between the focal length, the object size on the image data, and the object distance is expressed by the above expression (1). Since the object to be targeted is always the same object in the zooming panning sequence, the width of the object in the expression (1) can be defined as a fixed value. Thus, the object distance at each time point can be calculated from an arbitrary number of pieces of detected object size information and detected focal length information acquired in the step S901. The system control unit 10 predicts the object distance change speed after the step S902 is executed, by approximating, with the least squares method, the arbitrary number of pieces of object distance information and the arbitrary number of pieces of detection time information acquired in the step S901.

Next, in the step S903, the system control unit 10 predicts, based on the object distance change speed calculated in the step S902, the focal length change speed necessary for the object size on the image data to be constant after the step S903 is executed. The relational expression between the focal length, the object size on the image data, and the object distance is expressed by the above expression (1). Since the object to be targeted is always the same object in the zooming panning sequence, the width of the object in the expression (1) can be defined as a fixed value. Since the object size on the image data is fixed by the object size when the step S903 is executed, the focal length changing speed can be calculated from the object distance changing speed calculated in the step S902.

Next, in the step 904, the system control unit 10 determines the follow-up standby time based on the focal length change speed calculated in the step S903 and the focal length when the step S904 is executed. The system control unit 10 extracts the focal length change speed calculated in the step S903 and the follow-up standby time in the focal length when the step S904 is executed. They are extracted based on first data table including a combination of a plurality of focal lengths partitioned with arbitrary ranges stored in the memory 17 in the imaging apparatus 1 and a plurality of focal length change speeds partitioned with arbitrary ranges. This embodiment previously stores the follow-up standby time in the memory 17 in the imaging apparatus 1, as a value determined by a data table that contains a combination of a plurality of focal lengths partitioned with arbitrary ranges and a plurality of focal length change speeds partitioned with arbitrary ranges. The present invention is not limited to this embodiment. For example, an employed configuration may operate by an arbitrary method with a plurality of pieces of information.

Next, in the step S905, the system control unit 10 performs correction processing of the follow-up standby time determined in the step S904. The system control unit 10 adds an arbitrary value as the follow-up standby time correction value corresponding to the cumulative drive number of the zoom lens 2a controlled by the zoom control unit 9 to the follow-up standby time determined in the step S904. This embodiment adds the arbitrary value corresponding to the cumulative drive number of the zoom lens 2a in the follow-up standby time correction processing, but the present invention is not limited to this embodiment. For example, an arbitrary value or a calculated value may be added to or subtracted from an event having a certain influence on the driving time of the zoom lens 2a, such as temperature and orientation.

In the step S906, the system control unit 10 determines the focal length change amount during the follow-up standby time based on the focal length change speed calculated in the step S903 and the focal length when the step S906 is executed. The system control unit 10 extracts the focal length change amount between the focal length change speed calculated in the step S903 and the follow-up standby time corresponding to the focal length when the step S906 is executed. They are extracted based on a second data table that includes a combination of a plurality of focal lengths partitioned with arbitrary ranges previously stored in the memory 17 in the imaging apparatus 1 and a plurality of focal length change speeds partitioned with arbitrary ranges. Herein, the focal length change amount during the follow-up standby time is information with positive and negative polarities according to the change direction of the object size change information acquired in the step S901.

For example, assume that the object size is increasing or the object is moving towards the imaging apparatus 1 in the object size change information acquired in the step S901. Then, since the focal length needs to be reduced in order to perform the follow-up drive of the zoom lens 2a so that the object size follows the change, the focal length change amount during the follow-up standby time has a negative polarity. On the other hand, assume that the object size is decreasing or the object is moving away from the imaging apparatus 1 in the object size change information acquired in the step S901. Then, since it is necessary to increase the focal length in order to perform the follow-up drive of the zoom lens 2a so that the object size follow the change, the focal length change amount during the follow-up standby time has a positive polarity.

The focal length change amount during the follow-up standby time is previously stored in the memory 17 in the imaging apparatus 1, as a value determined from a data table containing a combination of a plurality of focal lengths partitioned with arbitrary ranges and a plurality of focal length change speeds partitioned with arbitrary ranges. However, the present invention is not limited to this embodiment. For example, an employed configuration may operate by an arbitrary method with a plurality of pieces of information.

Next, in the step S705 in FIG. 7A, the system control unit 10 determines whether the follow-up standby time predicted in the step S704 exceeds the predetermined time ts. When the follow-up standby time exceeds the predetermined time ts, the flow proceeds to the step S706. If the follow-up standby time does not exceed the predetermined time ts, the flow proceeds to the step S708.

In the step S706, the system control unit 10 calculates the reference focal length change speed necessary to set the follow-up standby time calculated by the method illustrated in the step S704 to be equal to or shorter than the predetermined time ts. The reference focal length change speed is extracted as reference time obtained by subtracting the follow-up standby time correction value added in the step S905 from the reference time ts. In other words, the focal length change speed at which the value is equal to or shorter than the reference time at the focal length when the step S706 is executed may be extracted from the first data table used for the step S904.

Next, in the step S707, the system control unit 10 drives the zoom lens 2a using the zoom control unit 9 so as to obtain the reference focal length change speed calculated in the step S706. Hereinafter, driving of the zoom lens 2a in the step S707 executed before the instruction of the SW2 (imaging start instruction) will be referred to as reference driving. Next, in the step S708, the system control unit 10 determines whether there is the instruction of the SW2 (imaging start instruction) through the user operation of the release switch 15. If there is no instruction of the SW2, the flow returns to the step S704. If there is the instruction of the SW2, the flow proceeds to the step S709.

In the step S709, the system control unit 10 sets the object size when there is determined the instruction of the SW2 in the step S708 to the target object size (target size information). The target size information means an object size to be targeted in maintaining constant the size of the object in the image data in the zooming panning.

Next, in the step S710, the system control unit 10 acquires the exposure time determined by the AE processing and stored in the internal memory 11. In this embodiment, the exposure time acquired in the step S710 is determined by the AE processing, but the exposure time is not limited to this embodiment. For example, where a predetermined exposure time is set in order to obtain the background streaming effect in the zooming panning mode, the time may be acquired. Next, in the step S711, the system control unit 10 performs first drive end information acquisition processing in the zooming panning sequence.

Figure 10A:
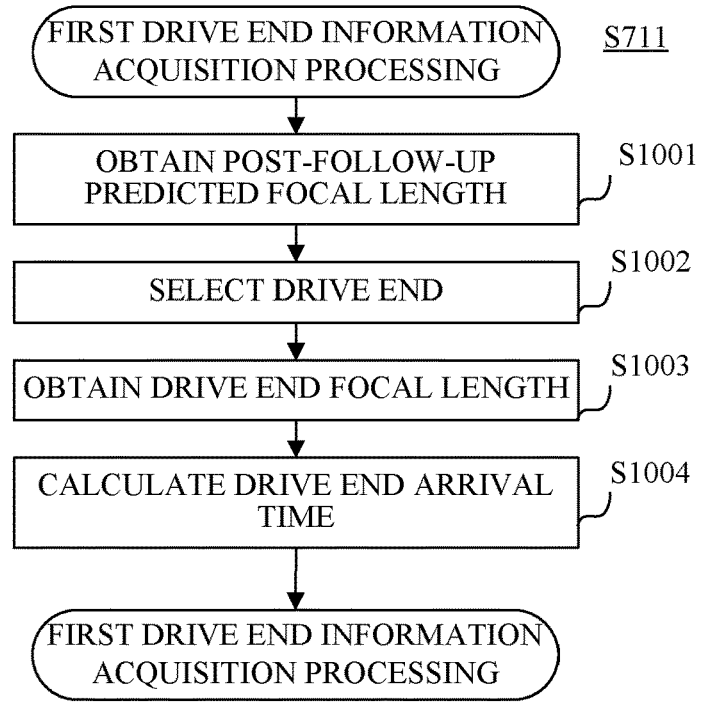
FIG. 10A is a flowchart of a first drive end information acquisition processing sequence according to the second embodiment.

Referring now to FIG. 10A, a description will be given of the first drive end information acquisition processing (drive end information acquisition processing sequence) in the zooming panning sequence. FIG. 10A is a flowchart of the first drive end information acquisition processing sequence (step S711). Each step in FIG. 10A is executed by the system control unit 10 in accordance with a program stored in the memory 17.

First, in the step S1001, the system control unit 10 predicts the focal length (the post-follow-up standby focal length) the follow-up standby time after the follow-up drive starts. This focal length can be predicted based on the focal length when the step S1001 is executed and the focal length change amount during the follow-up standby time determined in the step S906.

Next, in the step S1002, the system control unit 10 selects whether the drive end reachable in the zooming panning corresponds to the wide-angle end or telephoto end. This selection is made based on the polarity of the focal length change amount during the follow-up standby time determined in the step S906. For example, when the polarity of the focal length change amount is positive during the follow-up standby time determined in the step S906, the driving direction of the zoom lens 2a in the zooming panning is a direction from the wide-angle end to the telephoto end and thus the telephoto end is selected. On the other hand, when the polarity of the focal length change amount is negative during the follow-up standby time determined in the step S906, the driving direction of the zoom lens 2a in the zooming panning is a direction from the telephoto end to the wide-angle end and thus the wide-angle end is selected.

Next, in the step S1003, the system control unit 10 acquires the focal length at the drive end selected in the step S1002. The focal length at the drive end is previously stored in the memory 17 for each of the wide-angle end and the telephoto end. Next, in the step S1004, the system control unit 10 calculates the arrival time at the drive end selected in the step S1002. Herein, the arrival time is calculated based on the focal length change speed calculated in the step S903, the post-follow-up standby focal length predicted in the step S1001, and the focal length of the drive end acquired in the step S1003.

Next, in the step S712 in FIG. 7B, the system control unit 10 determines whether the zoom lens 2a reaches the drive end selected in the step S1002 during the exposure in the zooming panning (drive end arrival determination). In the drive end arrival determination, the exposure time acquired in the step S710 is compared with the arrival time at the drive end calculated in the step S1004. The exposure time acquired in the step S710 shorter than the arrival time at the drive end calculated in the step S1004 means that the zoom lens 2a does not reach the drive end during the exposure. The exposure time acquired in the step S710 longer than the arrival time at the drive end calculated in the step S1004 means that the zoom lens 2a reaches the drive end during the exposure. When the drive end arrival determination determines that the zoom lens 2a reaches the drive end, the flow proceeds to the step S713. On the other hand, if it is determined that the zoom lens 2a does not reach the drive end, the flow proceeds to the step S715.

In the step S713, the system control unit 10 further determines whether the zoom lens 2a reaches the drive end selected in the step S1002 during the follow-up standby in the zooming panning (follow-up standby drive end arrival determination). In the follow-up standby drive end arrival determination, the post-follow-up standby focal length predicted in the step S1001 is compared with the focal length at the drive end acquired in the step S1003. If the post-follow-up standby focal length predicted in the step S1001 is a focal length that does not pass through the focal length at the drive end acquired in the step S1003, it means that the zoom lens 2a does not reach the drive end during the follow-up standby. When the post-follow-up standby focal length predicted in the step S1001 is the focal length passing through the focal length at the drive end obtained in the step S1003, it means that the zoom lens 2a reaches the drive end during the follow-up standby. When the follow-up drive end arrival determination determines that the zoom lens 2a reaches the drive end, the flow proceeds to the step S718. If it is determined that the zoom lens 2a does not reach the drive end, the flow proceeds to the step S714.

In the step S714, the system control unit 10 changes the exposure time to the arrival time at the drive end calculated in the step S1004. This embodiment changes the exposure time to the arrival time at the drive end calculated in the step S1004, but the present invention is not limited to this embodiment. For example, the exposure time to be changed may be shorter than the arrival time at the drive end calculated in the step S1004.

In the step S715, the system control unit 10 performs the follow-up drive of the zoom lens 2a using the zoom control unit 9 so as to obtain the focal length change speed calculated in the step S902. Next, in the step S716, the system control unit 10 determines whether the zoom follow-up standby is necessary. If the zoom follow-up standby is necessary, the flow proceeds to the step S717. If the zoom follow-up standby is unnecessary, the flow proceeds to the step S718. Whether or not the zoom follow-up standby is necessary in the zooming panning operation of the imaging apparatus 1 when the step S716 is executed is determined by determining whether or not the current focal length change speed accords with the focal length change speed calculated in the step S902. In other words, when the current focal length change speed at the execution of the step S716 does not coincide with the focal length change speed calculated in the step S902, the zoom follow-up standby is determined necessary and the flow proceed to the step S717. When the current focal length change speed at the execution of the step S716 coincides with the focal length change speed calculated in the step S902, the zoom follow-up standby is determined unnecessary and the flow proceed to the S718.

In the step S717, the system control unit 10 determines whether or not the time from when the user instruction of the SW2 in the step S708 is executed to when the step S717 is executed exceeds the predetermined time t (the predetermined time t has passed after the SW2). If this time exceeds the predetermined time t, the flow proceeds to the step S718. If this time does not exceed the predetermined time t, the flow returns to the step S716 to continue the processing. If the time during which the zoom follow-up standby is determined necessary in the step S717 is less than the predetermined time t, the system control unit 10 repeatedly executes the processing in the steps S715 to S717.

In the step S718, the system control unit 10 stores as the last object distance information for imaging in the internal memory 11 the latest information among the object distance information detected from the detection start time of the object distance detection in the step S702 to the execution of the step S718. Next, in the step S719, the system control unit 10 stores as the last object size information for imaging in the memory 11 the latest information of the detected object size information detected from the object size detection start time point in the step S703 to the execution of the step S719. Next, in the step S720, the system control unit 10 stops detecting the object distance information through the object distance detection unit 19. Next, in the step S721, the system control unit 10 stops detecting the object size information through the object size detection unit 20.

Next, in the step S722, the system control unit 10 starts exposure (imaging) according to the exposure time acquired in the step S710 or the exposure time changed in the step S714.

Next, in the step S723, the system control unit 10 performs the follow-up drive of the zoom lens 2a through the zoom control unit 9 so as to obtain the focal length change speed calculated in the step S902. Next, in the step S724, the system control unit 10 determines whether or not the exposure started in the step S722 is completed. When the exposure is completed, the procedure shifts to the zooming panning continuous-imaging sequence described later. If the exposure has not yet been completed, the flow returns to the step S723 to continue the processing. In other words, while the exposure started in the step S722 is continuing, the system control unit 10 realizes zoom driving during exposure by repeatedly executing the processing in the step S723.

Thus, in the second zooming panning operation of the imaging apparatus 1, the system control unit 10 performs the follow-up drive of the zoom lens 2a during the exposure so as to maintain the object size when the instruction of the SW2 (exposure start instruction) is executed. Hence, it is unnecessary for the user to previously set the target object size, and it is possible to provide user-friendly zooming panning.

In the imaging standby state (the state of no SW2 instruction (imaging start instruction)), the system control unit 10 always performs the prediction processing of the follow-up standby time based on the detected object size. When the follow-up standby time exceeds the predetermined time ts, the reference driving of the zoom lens 2a starts so that the follow-up standby time is equal to or shorter than the predetermined time ts. Thereby, the follow-up standby time with the instruction of the SW2 thereafter can surely be made equal to or less than the predetermined time ts, so that the exposure (imaging) can be prevented from delaying due to the increase in follow-up standby time.

In the follow-up standby time prediction processing, a proper follow-up standby time can be predicted by determining the follow-up standby time according to the object size change before prediction processing and the focal length when the prediction is executed. The follow-up standby time correction processing corrects the follow-up standby time based on the cumulative drive number of the zoom lens 2a. Thereby, a change in follow-up standby time can be corrected which is caused by a change in driving characteristic due to the increased drive number of the zoom lens 2a, so that the follow-up standby time can be more accurately predicted.

The system control unit 10 determines whether or not the zoom lens 2a reaches the drive end during the exposure in the zooming panning when the instruction of the SW2 (imaging start instruction) is executed. When the zoom lens 2a reaches the drive end during exposure, the exposure time is changed to the time to reach the drive end. Thereby, the object size can be prevented from changing during the exposure.

When the instruction of the SW2 (imaging start instruction) is executed, the system control unit 10 determines whether or not the zoom lens 2a reaches the drive end during the follow-up standby time in the zooming panning. When the zoom lens 2a reaches the drive end during the follow-up standby time, the zoom lens 2a is not unnecessarily driven by performing no follow-up drive of the zoom lens 2a. The user can be notified that the zooming panning was not normally performed.

Figure 8A:
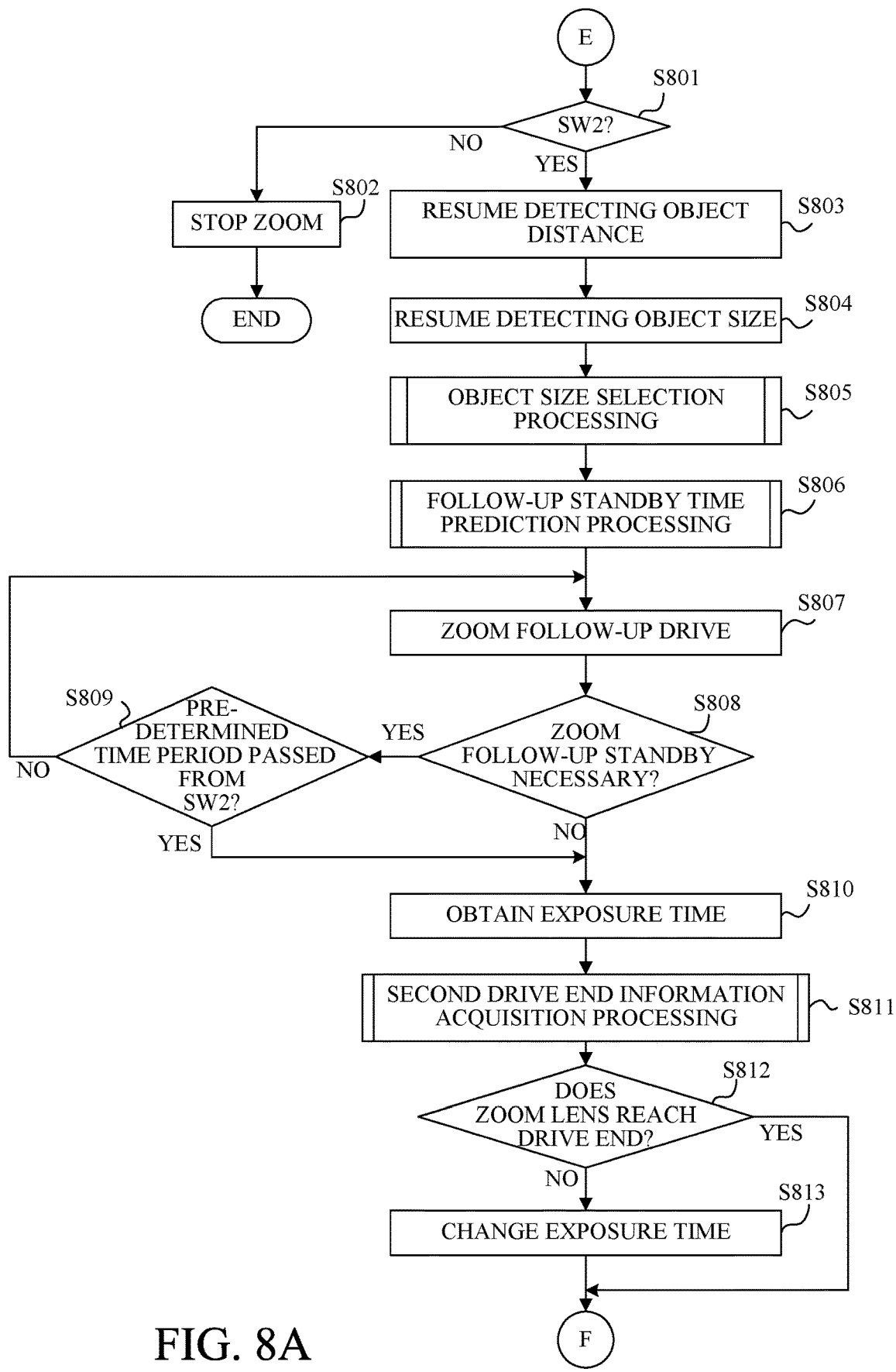
FIGS. 8A and 8B illustrate a flowchart of a continuous imaging sequence of zooming panning according to the second embodiment.
Figure 8B:
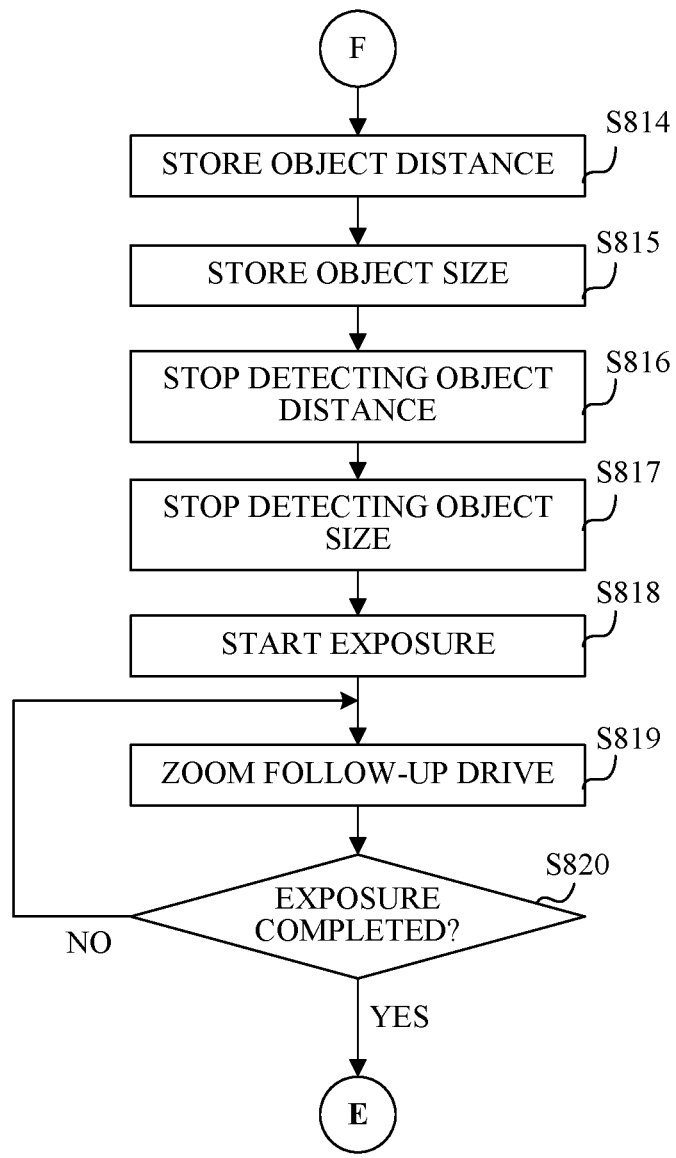

Referring now to FIGS. 8A and 8B, a description will be given of the second zooming panning continuous-imaging operation of the imaging apparatus 1. FIGS. 8A and 8B illustrate a flowchart of the second zooming panning continuous-imaging operation (continuous imaging sequence). Each step in FIGS. 8A and 8B is executed by the system control unit 10 in accordance with a program stored in the memory 17.

The imaging apparatus 1 proceeds to the step S801 following the above second zooming panning sequence ends. In the step S801, the system control unit 10 determines whether there is the instruction of the SW2 (imaging continuation instruction) through the user operation of the release switch 15. When there is the instruction of the SW2, the flow proceeds to the step S803. If there is no instruction of the SW2, the flow proceeds to the step S802.

In the step S802, if the zoom control unit 9 has already performed the zoom follow-up drive in the second zooming panning sequence described above, the system control unit 10 stops the zoom follow-up drive and ends the zooming panning continuous-imaging sequence.

In the step S803, the system control unit 10 resumes detecting the object distance information through the object distance detection unit 19 stopped in the step S720 of the above second zooming panning sequence or step S813 described later. Next, in the step S704, the system control unit 10 restarts detecting the object size information through the object size detection unit 20 stopped in the step S721 of the above second zooming panning sequence or step S814 described later.

Next, in the step S805, the system control unit 10 executes the object size selection processing in the zooming panning continuous-imaging sequence. The object size selection processing in the step S805 has the same meaning as that described above. Next, in the step S806, the system control unit 10 executes the follow-up standby time prediction processing in the zooming panning sequence. The follow-up standby time prediction processing in the step S806 has the same meaning as that described above.

In the step S807, the system control unit 10 performs the follow-up drive of the zoom lens 2a through the zoom control unit 9 so as to obtain the focal length change speed calculated in the step S902. Next, in the step S808, the system control unit 10 determines whether the zoom follow-up standby is necessary. If the zoom follow-up standby is necessary, the flow proceeds to the step S809. If the zoom follow-up standby is unnecessary, the flow proceeds to the step S810. Whether or not the zoom follow-up standby is necessary in the zooming panning operation of the imaging apparatus 1 is determined when the step S808 is executed by determining whether the current focal length change speed is equal to the focal length change speed calculated in the step S902. In other words, when the current focal length change speed when the step S808 is executed does not coincide with the focal length change speed calculated in the step S902, the zoom follow-up standby is determined necessary and the flow proceeds to the step S809. When the current focal length change speed in the step S808 coincides with the focal length change speed calculated in the step S902, the zoom follow-up standby is determined unnecessary and the flow proceeds to the step S810.

In the step S809, the system control unit 10 determines whether or not the time from when the user instruction of the SW2 is executed in the step S801 to when the step S717 is executed exceeds the predetermined time t (the predetermined time t passes after the SW2). If this time exceeds the predetermined time t, the flow proceeds to the step S718. If the time does not exceed the predetermined time t, the flow returns to the step S716 to continue the process. In other words, when the time during which the zoom follow-up standby is determined necessary in the step S717 is less than the predetermined time t, the system control unit 10 repeatedly executes the processing in the step S715 to S717.

Next, in the step S808, the system control unit 10 determines whether the zoom follow-up standby is necessary. If the zoom follow-up standby is necessary, the flow proceeds to the step S809. If the zoom follow-up standby is unnecessary, the flow proceeds to the step S810. The zoom follow-up standby is the same as the processing in the step S716 described above.

This embodiment executes the zoom follow-up standby in the step S808, but the present invention is not limited to this embodiment. For example, in order to shorten the time required for the zooming panning continuous-imaging sequence (the imaging time per a single image (frame rate) during continuous imaging), the zoom follow-up standby may be omitted. Alternatively, the user may select whether or not to execute the zoom follow-up standby in the zooming panning continuous-imaging sequence.

In the step S809, the system control unit 10 determines whether or not the time from when the user instruction of the SW2 is executed in the step S801 to when the step S809 is executed exceeds the predetermined time t (the predetermined time passes after the SW2 operation). If this time exceeds the predetermined time t, the flow proceeds to the step S810. If this time does not exceed the predetermined time t, the flow returns to the step S807 to continue the process. In other words, the system control unit 10 repeatedly executes the processing of the steps S807 to S809 while the time during which the zoom follow-up standby is determined necessary in the step S808 is less than the predetermined time t.

In the step S810, the system control unit 10 acquires the exposure time determined in the AE processing and stored in the internal memory 11. In this embodiment, the exposure time acquired in the step S810 is determined by the AE processing, but the exposure time is not limited to this embodiment. For example, where a predetermined exposure time is set in order to obtain the background streaming effect in the zooming panning mode, the time may be acquired. Next, in the step S811, the system control unit 10 performs second drive end information acquisition processing in the zooming panning sequence.

Figure 10B:
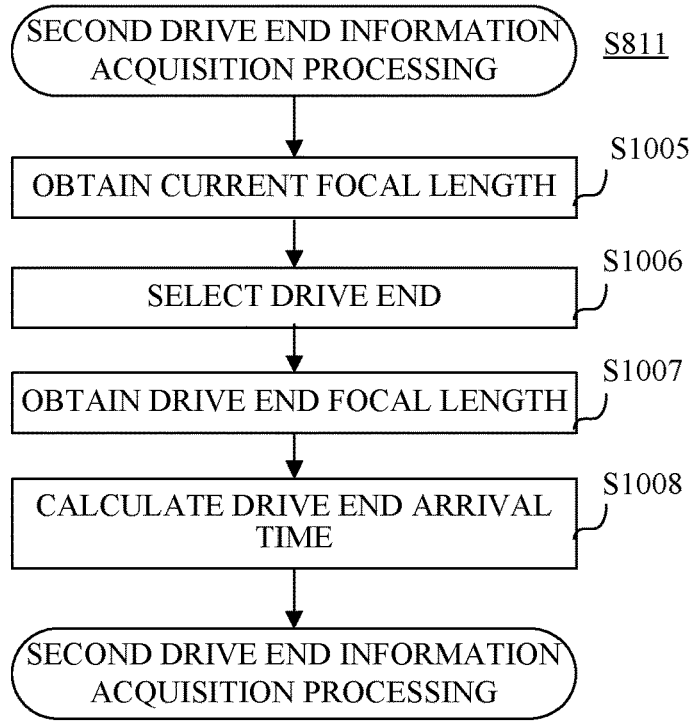
FIG. 10B is a flowchart showing a second drive end information acquisition processing sequence according to the second embodiment.

Referring now to FIG. 10B, a description will be given of the second drive end information acquisition processing (drive end information acquisition processing sequence) in the zooming panning sequence. FIG. 10B is a flowchart of a second drive end information acquisition processing sequence (step S811). Each step in FIG. 10B is executed by the system control unit 10 in accordance with a program stored in the memory 17.

First, in the step S1005, the system control unit 10 acquires the current focal length when step S1005 is executed. Next, in the step S1006, the system control unit 10 selects whether the drive end reachable in the zooming panning corresponds to the wide-angle end or telephoto end. This selection is made based on the polarity of the focal length change amount during the follow-up standby time determined in the step S906. For example, when the polarity of the focal length change amount is positive during the follow-up standby time determined in the step S906, the driving direction of the zoom lens 2a in the zooming panning is a direction from the wide-angle end to the telephoto end and thus the telephoto end is selected. When the polarity of the focal length change amount is negative during the follow-up standby time determined in the step S906, the driving direction of the zoom lens 2a in the zooming panning is a direction from the telephoto end to the wide-angle end and thus the wide-angle end is selected.

Next, in the step S1007, the system control unit 10 acquires the focal length at the drive end selected in the step S1006. The focal length at the drive end is previously stored in the memory 17 for each of the wide-angle end and the telephoto end. Next, in the step S1008, the system control unit 10 calculates the arrival time at the drive end selected in the step S1006. Herein, the arrival time is calculated based on the focal length change speed calculated in the step S903, the current focal length acquired and predicted in the step S1005, and the focal length at the drive end acquired in the step S1007.

Next, in the step S812 in FIG. 8A, the system control unit 10 determines whether the zoom lens 2a reaches the drive end selected in the step S1006 during the exposure in the zooming panning (drive end arrival determination). In the drive end arrival determination, the exposure time acquired in the step S810 is compared with the arrival time at the drive end calculated in the step S1008. The exposure time acquired in the step S810 shorter than the arrival time at the drive end calculated in the step S1008 means that the zoom lens 2a does not reach the drive end during the exposure. When the exposure time acquired in the step S810 longer than the arrival time at the drive end calculated in the step S1008 means that the zoom lens 2a reaches the exposure end during exposure. When the drive end arrival determination determines that the zoom lens 2a reaches the drive end, the flow proceeds to the step S813. If it is determined that the zoom lens 2a does not reach the drive end, the flow proceeds to the step S814.

In the step S813, the system control unit 10 changes the exposure time to the arrival time at the drive end calculated in the step S1008. This embodiment changes the exposure time to the arrival time at the drive end calculated in the step S1008, but the present invention is not limited to this embodiment. For example, the exposure time to be changed may be shorter than the arrival time at the drive end calculated in the step S1008.

In the step S814, the system control unit 10 stores in the memory 11 the latest object distance information among the object distance information detected from when the detection of the object distance is restarted in the step S803 to when the step S814 is executed. Next, in the step S815, the system control unit 10 stores the object size information selected in the step S805 in the internal memory 11. Next, in the step S816, the system control unit 10 stops detecting the object distance information through the object distance detection unit 19. Next, in the step S817, the system control unit 10 stops detecting the object size information through the object size detection unit 20.

Next, in the step S818, the system control unit 10 starts exposure (imaging) according to the exposure time acquired in the step S810 or the exposure time changed in the step S813. Next, in the step S819, the system control unit 10 performs the follow-up drive of the zoom lens 2a through the zoom control unit 9 so as to obtain the focal length change speed calculated in the step S902. Next, in the step S820, the system control unit 10 determines whether or not the exposure started in the step S818 is completed. If the exposure is completed, the flow returns to the step S801 and the system control unit 10 again executes the zooming panning continuous-imaging sequence. If the exposure has not yet been completed, the flow returns to the step S819 to continue the processing. In other words, while the exposure started in the step S818 is continuing, the system control unit 10 realizes the zoom follow-up drive during the exposure by repeatedly executing the processing of the step S819.

As described above, this embodiment selects or determines the object size information acquired by the two methods for use with the zoom follow-up drive in the next imaging in accordance with the reliabilities of the object distance information and the object size information in the zooming continuous-imaging sequence. The object size information acquired by the two methods contains the estimated object size information estimated from the object distance information and the detected object size information detected by the object size detection unit 20. Thereby, the accuracy of the object size information used for the zoom follow-up drive can be higher than that using only the detected object size information detected by the object size detection unit 20.

When a time period necessary for the object distance detection unit 19 to detect the object distance is shorter than a time period necessary for the object size detection unit 20 to detect the object size, the estimated object size information estimated from the object distance information detected by the object distance detection unit 19 may be used. As a result, it becomes possible to shorten a time period necessary for the zooming panning continuous-imaging sequence (imaging time (frame rate) per a single image in the continuous imaging).

The system control unit 10 determines whether or not the zoom lens 2a reaches the drive end during the exposure in the zooming panning continuous-imaging when the instruction of the SW2 is executed (the imaging start instruction) in the continuous imaging. When the zoom lens 2a reaches the drive end during exposure, the exposure time is changed to the time to reach the drive end. Thereby, the object size can be prevented from changing in middle of the exposure.

In the continuous imaging for which the zoom follow-up drive has been already performed, the system control unit 10 does not determine whether or not the zoom lens 2a reaches the drive end during the follow-up standby time in the zooming panning when the instruction of the SW2 (imaging start instruction) is executed. Thereby, the accuracy of the drive end arrival determination can be improved since the drive end arrival time becomes accurate information without the prediction component.

Thus, the control apparatus (system control unit 10) in this embodiment includes an information acquisition unit 10a and an imaging control unit 10b. The information acquisition unit 10a acquires the object size information from the image data. The imaging control unit 10b performs the exposure while performing the follow-up drive of the optical system 2 so as to reduce the difference between the object size information and the target size information. The imaging control unit predicts the follow-up time from the start of the follow-up drive to the stabilization of the follow-up drive before the follow-up drive starts. Then, the imaging control unit starts driving the optical system according to the follow-up time.

The follow-up time may be determined based on the focal length change speed calculated from the object size information and the focal length information of the optical system. The follow-up time may be corrected based on the characteristic change information of the optical system. The characteristic change information may be determined based on at least one of the cumulative drive number of the optical system, the internal temperature of the control apparatus, and the orientation of the control apparatus.

In continuously capturing the second and subsequent images by the continuous imaging, the imaging control unit does not predict the follow-up time from the end of the last exposure to the start of the next exposure. In continuously capturing the second and subsequent images by the continuous imaging, the imaging control unit continues the follow-up drive from the end of the last exposure to the start of the next exposure. The imaging control unit 10b determines whether or not the optical system 2 reaches the drive end during the follow-up drive, and changes the exposure time when the zoom lens 2a reaches the drive end.

The above embodiments have discussed so-called optical zoom that drives the optical system and changes a focal length (zoom magnification) so as to perform the zoom follow-up drive, but the electronic zoom can provide the follow-up drive. The electronic zoom and the optical zoom may be used together so that the zoom follows the object size change (object distance change). Controlling the zoom follow-up drive is called a follow-up control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above embodiments can provide a control apparatus, a control method, and a storage medium, each of which can perform good zooming panning of a motion object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2018-93373, filed on May 14, 2018, and 2019-29220, filed on Feb. 21, 2019, each of which is hereby incorporated by reference herein in its entirety.

What is claimed is:

1. A control apparatus comprising at least one processor which function as:
   an acquisition unit configured to acquire an object size from image data;
   a zoom control unit configured to perform a follow-up control of a zoom so as to reduce a difference between the object size and a target size; and
   an imaging control unit configured to control an image sensor so as to perform exposure during the follow-up control by the zoom control unit,
   wherein the imaging control unit
      determines whether to start the exposure of the image sensor based on a change amount of the object size during the follow-up control while the zoom control unit performs the follow-up control and
      controls the image sensor so as not to start the exposure of the image sensor when the change amount of the object size during the follow-up control is larger than a predetermined value.

2. The control apparatus according to claim 1, wherein the imaging control unit controls the image sensor based on the difference between the object size and the target size so that when the change amount of the object size is larger than the predetermined value, the image sensor does not start the exposure.

3. The control apparatus according to claim 1, wherein the imaging control unit controls the image sensor based on information on a change of an object distance so that the image sensor does not start the exposure when the change amount of the object size is larger than the predetermined value.

4. The control apparatus according to claim 1, wherein the imaging control unit controls the image sensor at a predetermined timing so that the image sensor starts the exposure when the change amount of the object size is equal to or smaller than the predetermined value and the image sensor does not start the exposure when the change amount of the object size is larger than the predetermined value.

5. The control apparatus according to claim 4, wherein when the change amount of the object size is larger than the predetermined value at the predetermined timing, the imaging control unit controls the image sensor so that the image sensor starts the exposure at a timing when the change amount of the object size changes from a value larger than the predetermined value to a value equal to or smaller than the predetermined value.

6. The control apparatus according to claim 4, wherein when the change amount of the object size is larger than the predetermined value at the predetermined timing, the imaging control unit provides the follow-up control based on information of the object size acquired by the acquisition unit before the predetermined timing, until the change amount of the object size changes from a value larger than the predetermined value to a value equal to or smaller than the predetermined value.

7. The control apparatus according to claim 4, wherein when the change amount of the object size is larger than the predetermined value at the predetermined timing, the imaging control unit controls the image sensor so that the image sensor starts the exposure when the change amount of the object size is larger than the predetermined value for a predetermined time period.

8. The control apparatus according to claim 4, wherein the predetermined timing is a timing when a user provides an imaging instruction.

9. The control apparatus according to claim 1, wherein the imaging control unit changes the predetermined value according to an exposure time.

10. The control apparatus according to claim 1, further comprising the image sensor configured to photoelectrically convert an optical image formed via an optical system and to output image data.

11. The control apparatus according to claim 1, wherein the zoom control unit predicts a follow-up time from when the follow-up control is started to when the follow-up control is stabilized, before the follow-up control starts, and starts driving an optical system according to the follow-up time.

12. The control apparatus according to claim 11, wherein the follow-up time is determined based on information on the object size and a focal length change speed calculated from focal length information of the optical system.

13. The control apparatus according to claim 12, wherein the follow-up time is corrected based on characteristic change information of the optical system.

14. The control apparatus according to claim 13, wherein the characteristic change information is information determined based on at least one of a cumulative drive number of the optical system, an internal temperature of the control apparatus, and an orientation of the control apparatus.

15. The control apparatus according to claim 11, wherein in continuously capturing second and subsequent images by continuous imaging, the imaging control unit does not predict the follow-up time from when a last exposure ends to when a next exposure starts.

16. The control apparatus according to claim 11, wherein in continuously capturing second and subsequent images by continuous imaging, the imaging control unit continues the follow-up control from when a last exposure ends to when a next exposure starts.

17. The control apparatus according to claim 1, wherein the imaging control unit determines whether to start the exposure of the image sensor based on the change amount of the object size after the zoom control unit starts the follow-up control.

18. A control method comprising the steps of:
   acquiring an object size from image data;
   starting a follow-up control to control a zoom so as to reduce a difference between the object size and a target size; and
   controlling an image sensor so as to perform exposure while performing the follow-up control,
   wherein the controlling step determines whether to start the exposure of the image sensor based on a change amount of the object size during the follow-up control while performing the follow-up control and controls the image sensor so as not to start the exposure of the image sensor when the change amount of the object size during the follow-up control is larger than a predetermined value.

19. The control method according to claim 18, wherein the step of performing the follow-up control predicts a follow-up time from when the follow-up control is started to when the follow-up control is stabilized, before the follow-up control starts, and starts driving an optical system according to the follow-up time.

20. A non-transitory computer readable storage medium storing a program that enables a computer to execute a control method comprising the steps of acquiring an object size from image data, starting a follow-up control to control a zoom so as to reduce a difference between the object size and a target size, and controlling an image sensor so as to perform exposure while performing the follow-up control,
wherein the controlling step determines whether to start the exposure of the image sensor based on a change amount of the object size during the follow-up control while performing the follow-up control and
controls the image sensor so as not to start the exposure of the image sensor when the change amount of the object size during the follow-up control is larger than a predetermined value.

21. The non-transitory computer readable storage medium according to claim 20, wherein the step of performing the follow-up control predicts a follow-up time from when the follow-up control is started to when the follow-up control is stabilized, before the follow-up control starts, and starts driving an optical system according to the follow-up time.

* * * * *